US011046719B2

(12) United States Patent
Kanno et al.

(10) Patent No.: US 11,046,719 B2
(45) Date of Patent: *Jun. 29, 2021

(54) ORGANIC METAL COMPOUND-CONTAINING COMPOSITION

(71) Applicant: NITTO DENKO CORPORATION, Ibaraki (JP)

(72) Inventors: Ryo Kanno, Ibaraki (JP); Tatsuya Yamasaki, Ibaraki (JP); Yuto Saruhashi, Ibaraki (JP); Ryuta Tomoyose, Ibaraki (JP); Takeshi Saito, Ibaraki (JP); Tetsuro Ikeda, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/764,766

(22) PCT Filed: Sep. 29, 2016

(86) PCT No.: PCT/JP2016/078891
§ 371 (c)(1),
(2) Date: Mar. 29, 2018

(87) PCT Pub. No.: WO2017/057617
PCT Pub. Date: Apr. 6, 2017

(65) Prior Publication Data
US 2018/0265526 A1    Sep. 20, 2018

(30) Foreign Application Priority Data

Sep. 26, 2016  (JP) .............................. JP2016-187155

(51) Int. Cl.
| | |
|---|---|
| *C07F 7/28* | (2006.01) |
| *C08L 57/10* | (2006.01) |
| *C08K 3/22* | (2006.01) |
| *C08F 20/06* | (2006.01) |
| *C08K 5/56* | (2006.01) |
| *C09J 7/38* | (2018.01) |
| *B32B 27/08* | (2006.01) |
| *C08K 3/013* | (2018.01) |
| *C08F 2/48* | (2006.01) |
| *C08F 2/44* | (2006.01) |

(52) U.S. Cl.
CPC ............... *C07F 7/28* (2013.01); *B32B 27/08* (2013.01); *C08F 20/06* (2013.01); *C08K 3/22* (2013.01); *C08K 5/56* (2013.01); *C08L 57/10* (2013.01); *C09J 7/385* (2018.01); *C08F 2/44* (2013.01); *C08F 2/48* (2013.01); *C08F 2800/10* (2013.01); *C08K 3/013* (2018.01); *C08K 2003/2237* (2013.01)

(58) Field of Classification Search
CPC ... C07F 7/28; C08L 57/10; C08K 3/22; C08F 20/06

USPC ......................................................... 524/413
See application file for complete search history.

(56) References Cited

U.S. PATENT DOCUMENTS

| | | | | |
|---|---|---|---|---|
| 3,632,413 | A * | 1/1972 | Blance ................ | C09J 133/066 442/151 |
| 5,130,167 | A * | 7/1992 | Mitsuji ................ | C08K 5/0091 427/407.1 |
| 5,439,748 | A * | 8/1995 | Nakamura ............ | C08F 220/28 428/511 |
| 6,177,540 | B1 * | 1/2001 | Harlan ................. | C09J 7/38 528/364 |
| 6,472,056 | B1 | 10/2002 | Rea et al. | |
| 2008/0247009 | A1 | 10/2008 | Mennig et al. | |
| 2009/0010603 | A1 * | 1/2009 | Sugioka ............... | C08K 3/22 385/123 |
| 2009/0029284 | A1 * | 1/2009 | Matsumaru ........... | G03F 7/405 430/270.1 |
| 2010/0208343 | A1 | 8/2010 | Yoshida et al. | |
| 2011/0032455 | A1 | 2/2011 | Kim et al. | |
| 2011/0104596 | A1 | 5/2011 | Shimada et al. | |
| 2012/0064347 | A1 | 3/2012 | Kita et al. | |
| 2012/0314161 | A1 | 12/2012 | Park et al. | |
| 2013/0244041 | A1 | 9/2013 | Cho et al. | |
| 2014/0160405 | A1 | 6/2014 | Huh et al. | |
| 2014/0255689 | A1 | 9/2014 | Yasui et al. | |
| 2015/0051344 | A1 | 2/2015 | Matsukawa et al. | |
| 2015/0116817 | A1 | 4/2015 | Inui et al. | |
| 2019/0055432 | A1 | 2/2019 | Kanno et al. | |

FOREIGN PATENT DOCUMENTS

| | | |
|---|---|---|
| CN | 1566244 A | 1/2005 |
| CN | 101688098 A | 3/2010 |
| CN | 101910345 A | 12/2010 |
| CN | 101959923 A | 1/2011 |
| CN | 102212317 A | 10/2011 |
| CN | 102408839 A | 4/2012 |
| CN | 102870019 A | 1/2013 |
| CN | 103293857 A | 9/2013 |

(Continued)

OTHER PUBLICATIONS

Notification of Transmittal of Translation of the International Preliminary Report on Patentability (Form PCT/IB/338) issued in counterpart International Application No. PCT/JP2016/078891 dated Apr. 12, 2018, with Forms PCT/IB/373 and PCT/ISA/237. (8 pages).

(Continued)

*Primary Examiner* — Doris L Lee
(74) *Attorney, Agent, or Firm* — Westerman, Hattori, Daniels & Adrian, LLP

(57) ABSTRACT

An organic metal compound-containing composition, comprising: at least one organic metal compound (A) selected from the group consisting of metal alkoxides and metal chelates, and a polymerizable compound (B) having a polymerizable functional group and a carboxyl group.

5 Claims, No Drawings

(56) References Cited

FOREIGN PATENT DOCUMENTS

| | | | |
|---|---|---|---|
| CN | 103748488 A | 4/2014 | |
| CN | 103917617 A | 7/2014 | |
| CN | 104395420 A | 3/2015 | |
| JP | 9-194514 A | 7/1997 | |
| JP | 11-29607 A | 2/1999 | |
| JP | 2004-115612 A | 4/2004 | |
| JP | 2005-515292 A | 5/2005 | |
| JP | 2007-171887 A | 7/2007 | |
| JP | 2008-524353 A | 7/2008 | |
| JP | 2009-221255 A | 10/2009 | |
| JP | 2012-172026 A | 9/2012 | |
| JP | 2014-56122 A | 3/2014 | |
| JP | 2015-151424 A | 8/2015 | |
| JP | 2017-068256 A | 4/2017 | |
| TW | 201105513 A | 2/2011 | |
| WO | 2010/143512 A1 | 12/2010 | |
| WO | 2013/161859 A1 | 10/2013 | |
| WO | 2015/022825 A1 | 2/2015 | |

OTHER PUBLICATIONS

International Search Report dated Dec. 13, 2016, issued in counterpart International Application No. PCT/JP2016/078891 (2 pages).
Office Action dated Oct. 30, 2019, issued in counterpart CN Application No. 201680055629.3, with English translation (21 pages).
Office Action dated Feb. 19, 2020, issued in counterpart JP application No. 2016-187155, with English translation. (8 pages).
Office Action dated Jun. 10, 2020, issued in counterpart TW application No. 105131650, with English translation. (8 pages).
Office Action dated Oct. 2, 2020, issued in counterpart JP Application No. 2016-187155, with English Translation. (6 pages).
Office Action dated Aug. 7, 2020, issued in counterpart CN Application No. 201680055629.3, with English Translation. (11 pages).
Search Report dated Feb. 20, 2021, issued in CN Application No. 201680055990.6, with English Translation. (6 pages) Counterpart to U.S. Appl. No. 15/764,115.

\* cited by examiner

ORGANIC METAL COMPOUND-CONTAINING COMPOSITION

TECHNICAL FIELD

The present invention relates to an organic metal compound-containing composition containing an organic metal compound and a polymerizable compound.

BACKGROUND ART

Organic metal compounds are used for various use purposes as, e.g., catalysts for esterification of a monomer or polymer, polycondensation, poly-olefination, silicone curing or other reactions; crosslinking agents for inorganic paints or heat-resistant paints; primer materials; and titanium-oxide-film materials.

For example, Patent Document 1 listed below discloses an example in which an alkoxy-containing metal compound is blended in a photosensitive composition used for liquid crystal display elements or organic EL displays.

PRIOR ART DOCUMENT

Patent Document

Patent Document 1: JP-A-2014-56122

SUMMARY OF THE INVENTION

Problems to be Solved by the Invention

The inventors have found out that in the case of adding, out of organic metal compounds, at least one organic metal compound selected from the group consisting of metal alkoxides and metal chelates to, for example, an active-energy-ray curable component, the organic metal compound contributes to a very good adhesion of the resultant and an improvement in water resistance thereof. However, it has been proved that the organic metal compound is high in reactivity so that the compound contacts water in the atmospheric air or a very small amount of water contained in a raw material of a composition that is added to the compound to cause a hydrolysis reaction and a self-condensation reaction, and this matter makes the compound low in stability. The inventors have searched documents including the above-mentioned document. As a result, the inventors have not found any report example in which the liquid stability of an organic metal compound-containing composition is improved into a high level, and found out a new theme that when an organic metal compound is used, the stability thereof should be improved.

In the light of the above-mentioned actual situation, the present invention has been developed, and an object thereof is to provide an organic metal compound-containing composition excellent in liquid stability, long in pot life, and also excellent in producibility.

Means for Solving the Problems

In order to solve the above-mentioned problem, the inventors have made eager investigations to find out that an organic metal compound-containing composition described below can achieve the object. In this way, the inventors have attained a solution of the present invention.

Thus, the present invention relates to an organic metal compound-containing composition, comprising: at least one organic metal compound (A) selected from the group consisting of metal alkoxides and metal chelates, and a polymerizable compound (B) having a polymerizable functional group and a carboxyl group.

It is preferred in the composition that the metal of the organic metal compound (A) is titanium.

It is preferred in the composition that one or more of the metal alkoxides are contained as the organic metal compound (A), and the number of carbon atoms of an organic group or each of organic groups which the metal alkoxide(s) has/have is 4 or more.

It is preferred in the composition that one or more of the metal chelates are contained as the organic metal compound (A), and the number of carbon atoms of an organic group or each of organic groups which the metal chelate(s) has/have is 4 or more.

It is preferred in the composition that the proportion of the organic metal compound (A) is from 5 to 90% by weight.

It is preferred in the composition that the polymerizable compound (B) is a radical polymerizable compound.

It is preferred in the composition that the polymerizable compound (B) has a molecular weight of 100 (g/mol) or more.

It is preferred in the composition that the polymerizable compound (B) is a polymerizable compound having a polymerizable functional group and a carboxyl group between which an organic group that has 1 to 20 carbon atoms and that may have oxygen is interposed.

It is preferred in the composition that when the total amount of the organic metal compound (A) in the composition is represented by $\alpha$ (mol), the content of the polymerizable compound (B) in the composition is $0.25\alpha$ (mol) or more.

Effect of the Invention

When the liquid stability of a composition containing the organic metal compound (A) is unstable, even in any article the composition is used, the article becomes short in pot life. Thus, such compositions tend to be deteriorated in producibility. It is presumed that one reason for this tendency is as follows: the organic metal compound (A) is high in reactivity, so that the compound contacts water in the atmospheric air or a very small amount of water contained in the composition to cause a hydrolysis reaction and a self-condensation reaction; consequently, the organic metal compound (A) self-aggregates so that the composition liquid becomes clouded (the generation, phase-separation and precipitation of aggregates). However, in the present invention, the metal compound-containing composition contains not only the organic metal compound (A) but also the polymerizable compound (B), which has a polymerizable functional group and a carboxyl group. For this reason, the hydrolysis reaction and the self-condensation reaction of the organic metal compound (A) are restrained so that the organic metal compound (A) can be dramatically improved in liquid stability in the composition. Reasons why this advantageous effect is gained are unclear; however, it can be presumed that the reasons are the following reasons (1) and (2):

(1) The carboxyl group which the polymerizable compound (B) has is strongly bonded and/or coordinated to the metal which the organic metal compound (A) has, so that the electron density of the metal increases. Consequently, the organic metal compound (A) can be decreased in force for attracting a water molecule, or any other ligand.

(2) The polymerizable compound (B), which has the carboxyl group, further has the polymerizable functional group to be bulky. For this reason, after the polymerizable compound (B) is bonded and/or coordinated through the carboxyl group to the organic metal compound (A), the other ligand does not approach the metal easily.

As described above, in the organic metal compound-containing composition, the carboxyl group which the polymerizable compound (B) has is strongly bonded and/or coordinated to the metal which the organic metal compound (A) has. The bonding and/or coordinating make (s) the organic metal compound (A) stable. When only the organic metal compound (A) and the polymerizable compound (B) are mixed with each other and caused to react with each other, the reaction rate and/or the coordination rate between these compounds is/are dramatically heightened so that the resultant organic metal compound-containing composition comes to contain, at a high concentration, a reaction product and/or a coordinate product made from the organic metal compound (A) and the polymerizable compound (B). Accordingly, in the resultant organic metal compound-containing composition, the organic metal compound (A) is very high in stability. Even when the organic metal compound-containing composition is added to and mixed with a different component, for example, an active-energy-ray curable component, the organic metal compound likewise becomes high in stability in the resultant composition.

As described above, in the organic metal compound-containing composition according to the present invention, the contained organic metal compound (A) is remarkably good in stability. Thus, in the case of using the composition, for many use purposes, as, e.g., one raw material of an adhesive composition which contains an active-energy-ray curable component, or as a catalyst, a crosslinking agent or any other article that may be for various purposes, the composition is excellent in liquid stability and is improvable in pot life.

MODE FOR CARRYING OUT THE INVENTION

The organic metal compound-containing composition of the present invention includes at least one organic metal compound (A) selected from the group consisting of metal alkoxides and metal chelates, and a polymerizable compound (B) having a polymerizable functional group and a carboxyl group.
<At Least One Organic Metal Compound (A) Selected from Group Consisting of Metal Alkoxides and Metal Chelates>

The metal alkoxides are each a compound in which at least one alkoxy group, which is an organic group, is bonded to a metal. The metal chelates are each a compound in which an organic group is bonded or coordinated through an oxygen atom to a metal. The metals are each preferably titanium, aluminum or zirconium. When the organic metal compound-containing composition is used as, for example, one raw material of an adhesive composition which contains an active-energy-ray curable component, the metal of the organic metal compound is preferably, out of these metals, titanium from the viewpoint of an improvement of an adhesive layer yielded therefrom in adhesion water-resistance.

When the organic metal compound-containing composition according to the present invention contains one or more of the metal alkoxides as the organic metal compound, the number of carbon atoms of an organic group or each of organic groups which the metal alkoxide(s) has/have is preferably 3 or more, more preferably 4 or more. If the number of the carbon atoms is 2 or less, the pot life of the organic metal compound-containing composition becomes short. Additionally, when the composition is used, for example, as one raw material of an adhesive composition which contains an active-energy-ray curable component, the effect of improving the adhesion water-resistance may be lowered. The organic group in which the number of carbon atoms is 4 or more is, for example, a butoxy group, and this group is preferably usable. Preferred examples of the metal alkoxide(s) include tetraisopropyl titanate, tetra-n-butyl titanate, butyl titanate dimer, tetraoctyl titanate, tert-amyl titanate, tetra-tert-butyl titanate, tetrastearyl titanate, zirconium tetraisopropoxide, zirconium tetra-n-butoxide, zirconium tetraoctoxide, zirconium tetra-tert-butoxide, zirconium tetrapropoxide, aluminum sec-butyrate, aluminum ethylate, aluminum isopropylate, aluminum butyrate, aluminum diisopropylate mono-sec-butyrate, and mono-sec-butoxy-aluminum diisopropylate. Out of these examples, tetraoctyl titanate is preferred.

When the organic metal compound-containing composition according to the present invention contains one or more of the metal chelates as the organic metal compound, the number of carbon atoms of an organic group or each of organic groups which the metal chelate(s) has/have is preferably 4 or more. If the number of the carbon atoms is 3 or less, the pot life of the organic metal compound-containing composition becomes short. Additionally, when the composition is used, for example, as one raw material of an adhesive composition which contains an active-energy-ray curable component, the effect of improving the adhesion water-resistance may be lowered. The organic group in which the number of carbon atoms is 4 or more is, for example, an acetylacetonate group, ethylacetoacetate group, isostearyl group, or octyleneglycolate group. When the organic metal compound-containing composition is used as, for example, one raw material of an adhesive composition which contains an active-energy-ray curable component, preferred are, out of these groups, acetylacetonate and ethylacetoacetate groups from the viewpoint of an improvement of the resultant adhesive layer in adhesion water-resistance. Preferred examples of the metal chelate(s) include titanium acetylacetonate, titanium octyleneglycolate, titanium tetraacetylacetonate, titanium ethylacetoacetate, polyhydroxytitanium stearate, dipropoxy-bis(acetylacetonato)titanium, dibutoxytitanium-bis(octyleneglycolate), dipropoxytitanium-bis(ethylacetoacetate), titanium lactate, titanium diethanolaminate, titanium triethanolaminate, dipropoxytitanium-bis(lactate), dipropoxytitanium-bis(triethanolaminate), di-n-butoxytitanium-bis(triethanolaminate), tri-n-butoxytitanium monostearate, diisopropoxy.bis(ethylacetoacetate)titanium, diisopropoxy.bis(acetylacetate)titanium, diisopropoxy.bis(acetylacetone)titanium, a titanium phosphate compound, an ammonium salt of titanium lactate, titanium-1,3-propanedioxybis(ethylacetoacetate), a titanium dodecylbenzenesulfonate compound, titanium aminoethylaminoethanolate, zirconium tetraacetylacetonate, zirconium monoacetylacetonate, zirconium bisacetylacetonate, zirconium acetylacetonate bisethylacetoacetate, zirconium acetate, tri-n-butoxyethylacetoacetatezirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium, tetrakis(ethylacetoacetate)zirconium, aluminum ethylacetoacetate, aluminum acetylacetonate, aluminum acetylacetonate bisethylacetoacetate, diisopropoxyethylacetoacetatealuminum, diisopropoxyacetylacetonatealuminum, isopropoxybis(ethylacetoacetate)aluminum, isopropoxybis(acetylacetonate)aluminum, tris(ethylacetoacetate)aluminum, tris(acetylacetonate)aluminum, and monoacetylacetonatebis(ethylacetate)aluminum. Out of these examples, preferred are titanium acetylacetonate and titanium ethylacetoacetate.

Examples of the organic metal compound that are usable in the present invention include, besides the above-mentioned compounds, organic carboxylic acid metal salts such as zinc octylate, zinc laurate, zinc stearate, and tin octylate; and zinc chelate compounds such as acetylacetone zinc chelate, benzoylacetone zinc chelate, dibenzoylmethane zinc chelate, and ethyl acetoacetate zinc chelate.

In the present invention, the proportion of the organic metal compound (A) in the organic metal compound-containing composition is preferably from 5 to 90% by weight, more preferably from 10 to 80% by weight. If the blend amount is more than 90% by weight, the organic metal compound-containing composition may be unfavorably deteriorated in storage stability. If the amount is less than 5% by weight, advantageous effects thereof are not sufficiently exhibited.

<Polymerizable Compound (B) Having Polymerizable Functional Group and Carboxyl Group>

The polymerizable compound (B) has a polymerizable functional group and a carboxyl group. The polymerizable compound (B) may contain one or two or more polymerizable functional groups, and may contain one or two or more carboxyl groups.

The polymerizable functional group or each of the polymerizable functional groups is not particularly limited, and examples thereof include a carbon-carbon-double-bond containing group, an epoxy group, an oxetanyl group, and a vinyl ether group.

The polymerizable functional group is, in particular, preferably a radical polymerizable functional group represented by the following general formula (I):

wherein $R^1$ represents hydrogen or an organic group having 1 to 20 carbon atoms; or the following general formula (II):

wherein $R^1$ represents hydrogen or an organic group having 1 to 20 carbon atoms, and $R^3$ represents a direct bond or an organic group having 1 to 20 carbon atoms. Particularly preferred is the radical polymerizable functional group in which $R^1$ or $R^2$ is hydrogen or a methyl group.

The bonding site of the carboxyl group in the polymerizable compound (B) is not particularly limited. From the viewpoint of an improvement in the liquid stability of the organic metal compound (A) in the composition, a radical polymerizable compound in which a radical polymerizable functional group and a carboxyl group are bonded to each other between which an organic group that has 1 to 20 carbon atoms and that may have oxygen is interposed is more preferred than (meth)acrylic acid, in which a radical polymerizable functional group is directly bonded to a carboxyl group.

From the viewpoint of an improvement in the liquid stability of the organic metal compound (A) in the composition, it is preferred that the molecular weight of the polymerizable compound (B) is large so that when the polymerizable compound (B) is bonded and/or coordinated to the organic metal compound (A), the resultant product is bulky and thus when a different ligand is coordinated thereto, the polymerizable compound (B) gives a steric hindrance. The steric hindrance given by the polymerizable compound (B) lowers the reaction rate of a ligand exchange reaction of the organic metal compound (A), and a hydrolysis reaction or condensation reaction thereof, so that the organic metal compound is stabilized. Thus, the molecular weight of the polymerizable compound (B) is preferably 100 (g/mol) or more, more preferably 125 (g/mol) or more, even more preferably 150 (g/mol) or more, in particular preferably 200 (g/mol) or more, most preferably 250 (g/mol) or more. The upper limit of the molecular weight of the polymerizable compound (B) is not particularly limited, and is preferably 400 (g/mol) or less, more preferably 350 (g/mol) or less.

From the viewpoint of an improvement in the liquid stability of the organic metal compound (A) in the composition, the polymerizable compound (B) is preferably a polymerizable compound having a polymerizable functional group and a carboxyl group between which an organic group that has 1 to 20 carbon atoms and that may have oxygen is interposed. Examples of the organic group include alkyl, alkenyl, alkynyl, alkylidene, alicyclic, unsaturated alicyclic, alkyl ester, aromatic ester, acyl, hydroxyalkyl, and alkyleneoxide groups. Such organic groups may be present singly; or the same groups of such organic groups may be bonded to each other, or different groups thereof may be bonded to each other. Specific examples of the polymerizable compound (B) include β-carboxyethyl acrylate, carboxypentyl acrylate, β-carboxyethyl methacrylate, 2-acryloyloxyethyl succinic acid, 2-acryloyloxyethylhexahydrophthalic acid, 2-acryloyloxyethyl phthalic acid, ω-carboxy-polycaprolactone monoacrylate, 2-acryloyloxyethyltetrahydrophthalic acid, 2-acryloyloxypropyloxyphthalic acid, 2-acryloyloxypropyltetrahydrophthalic acid, 2-acryloyloxypropylhexahydrophthalic acid, methacryloyloxyethylsuccinic acid, methacryloyloxyethylphthalic acid, methacryloyloxyethyltetrahydrophthalic acid, methacryloyloxyethylhexahydrophthalic acid, 2-methacryloyloxypropyloxyphthalic acid, 2-methacryloyloxypropyltetrahydrophthalic acid, and 2-methacryloyloxypropylhexahydrophthalic acid.

From the viewpoint of an improvement in the liquid stability of the organic metal compound (A) in the composition, when the total amount of the organic metal compound (A) in the organic metal compound-containing composition is represented by α (mol), the content of the polymerizable compound (B) in the composition is preferably 0.25α (mol) or more, more preferably 0.35α (mol) or more, even more preferably 0.5α (mol) or more, in particular preferably 1α (mol) or more. If the content of the polymerizable compound (B) is too small, the stability of the organic metal compound (A) becomes insufficient so that the hydrolysis reaction and self-condensation reaction thereof may easily advance, and the composition may become short in pot life. The upper limit of the content of the polymerizable compound (B) relative to the total amount α (mol) of the organic metal compound (A) is preferably less than 200α (mol), more preferably less than 100α (mol), even more preferably less than 20α (mol), in particular preferably less than 6α (mol). If the content of the polymerizable compound (B) is too large, the organic metal compound is excessively stabilized. Thus, when the composition is blended into, for example, a curable adhesive composition for polarizing films, a reaction between the resultant adhesive layer and a polarizer is easily hindered so that the resultant may be poor in adhesion and water resistance.

In the organic metal compound-containing composition according to the present invention, the contained organic metal compound (A) is remarkably good in stability.

Accordingly, the composition is usable, for many use purposes, as, e.g., various articles such as catalysts and cross-linking agents. As an example of the articles, hereinafter, an example will be described in which the composition is used as one raw material of an adhesive composition which contains an active-energy-ray curable component. However, articles in which the organic metal compound-containing composition according to the present invention is used are not limited to adhesives.

In the case of using the organic metal compound-containing composition according to the present invention for an adhesive composition, particularly, for a curable adhesive composition for a polarizing film in which a polarizer and a transparent protective film are laminated onto each other through an adhesive layer, this curable adhesive composition for the polarizing film contains an active-energy-ray curable component (X) and the organic metal compound-containing composition. In this curable adhesive composition for the polarizing film, the adhesion between the polarizer and the transparent protective film is good. Thus, the adhesive layer can be formed with an excellent water resistance under severe conditions in a dew condensation environment or other environments. Additionally, the curable adhesive composition is excellent in liquid stability, long in pot life, and further excellent in producibility. It can be presumed that reasons why such advantageous effects are gained are as follows:

In the case of exposing, to a dew condensation environment, a polarizing film in which a transparent protective film is laminated onto a polarizer through an adhesive layer, adhesion exfoliation may be generated, in particular, between the adhesive layer and the polarizer. A mechanism of the generation can be presumed as follows: Initially, water transmitted through the protective film diffuses into the adhesive layer to diffuse to the polarizer-interface-side of the polarizing film. When the polarizing film is a conventional polarizing film, large is the degree of contribution of hydrogen bonding and/or ion bonding to adhering strength between the adhesive layer and the polarizer. However, the water diffusing to the polarizer-interface-side causes the dissociation of the hydrogen bonding and the ion bonding in the interface. Consequently, between the adhesive layer and the polarizer, the adhering strength is lowered. In this way, adhesion exfoliation may be generated between the adhesive layer and the polarizer in the dew condensation environment.

In the meantime, the curable adhesive composition, for polarizing films, according to the present invention contains the organic metal compound-containing composition, particularly, at least one organic metal compound (A) selected from the group consisting of metal alkoxides and metal chelates. This organic metal compound (A) becomes an active metal species through the intervention of water, so that the organic metal compound (A) interacts strongly with both of the polarizer and the active-energy-ray curable component (X) included in the adhesive layer. In this way, even when water is present in the interface between the polarizer and the adhesive layer, these strongly interact with each other through the organic metal compound (A) to make a dramatic improvement in the adhesion water-resistance between the polarizer and the adhesive layer.

As described above, the organic metal compound (A) contributes largely to an improvement of the adhesive layer in adhesion and water resistance; however, a composition containing this compound tends to become unstable in liquid stability, thereby becoming short in pot life and becoming bad in producibility. In the present invention, however, in the organic metal compound-containing composition, the carboxyl group which the polymerizable compound (B) has is strongly bonded and/or coordinated to the metal which the organic metal compound (A) has, so that the organic metal compound (A) is very satisfactorily stabilized. Accordingly, the organic metal compound (A) can be restrained from undergoing a hydrolysis reaction and a self-condensation reaction, and be dramatically improved in liquid stability in the composition.

<Active-Energy-Ray Curable Component (X)>

A curable adhesive composition for polarizing films, which is an article to which the organic metal compound-containing composition according to the present invention is applied, contains an active-energy-ray curable component (X) as a curable component.

The active-energy-ray curable component (X) is preferably an electron-beam curing-type, an ultraviolet-ray curing-type, a visible-ray curing-type, or any other active-energy-ray curing-type component. An ultraviolet-ray curing-type or visible-ray curing-type adhesive composition can be classified into a radical polymerization curable adhesive composition or a cation polymerizable adhesive composition. In the present invention, any active energy ray having a wavelength of 10 nm or more and less than 380 nm is represented as an ultraviolet ray; and any active energy ray having a wavelength of 380 to 800 nm, as a visible ray.

<1: Radical Polymerization Curable Adhesive Composition>

The above-mentioned curable component is, for example, a radical polymerizable compound used in a radical polymerization curable adhesive composition. Examples of the radical polymerizable compound include compounds each having a C—C-double-bond-having radical polymerizable functional group, such as a (meth)acryloyl group or a vinyl group. These curable components may each be a monofunctional radical polymerizable compound, or bifunctional or any other polyfunctional radical polymerizable compound. These radical polymerizable compounds may be used singly or in any combination of two or more thereof. These radical polymerizable compounds are preferably, for example, compounds each having a (meth)acryloyl group. In the present invention, the word (meth)acryloyl denotes an acryloyl group and/or a methacryloyl group. The word "(meth)" has a similar meaning.

<<Monofunctional Radical Polymerizable Compound>>

The monofunctional radical polymerizable compound is, for example, a (meth)acrylamide derivative, which has a (meth)acrylamide group. The (meth)acrylamide derivative is preferred in order that the organic metal compound-containing composition can ensure adhesion to a polarizer or various transparent protective films, and such compositions can be excellent in producibility because of a large polymerization velocity of the derivative. Specific examples of the (meth)acrylamide derivative include N-alkyl-group-containing (meth)acrylamide derivatives such as N-methyl(meth)acrylamide, N,N-dimethyl(meth)acrylamide, N,N-diethyl(meth)acrylamide, N-isopropyl(meth)acrylamide, N-butyl(meth)acrylamide, and N-hexyl(meth)acrylamide; N-hydroxyalkyl-group-containing (meth)acrylamide derivatives such as N-methylol(meth)acrylamide, N-hydroxyethyl(meth)acrylamide, and N-methylol-N-propane(meth)acrylamide; N-aminoalkyl-group-containing (meth)acrylamide derivatives such as aminomethyl(meth)acrylamide, and aminoethyl(meth)acrylamide; N-alkoxy-group-containing (meth)acrylamide derivatives such as N-methoxymethylacrylamide, and N-ethoxymethylacrylamide; and N-mercaptoalkyl-group-containing (meth)acrylamide derivatives such as mercaptomethyl(meth)acrylamide, and mercaptoethyl (meth)acrylamide. Examples of a hetero ring-containing (meth)acrylamide derivative, in which the nitrogen atom of a (meth)acrylamide group forms a hetero ring, include N-acryloylmorpholine, N-acryloylpiperidine, N-methacryloylpiperidine, and N-acryloylpyrrolidine.

Out of these (meth)acrylamide derivatives, preferred are N-hydroxyalkyl-group-containing (meth)acrylamide derivatives, and particularly preferred is N-hydroxyethyl(meth)acrylamide from the viewpoint of the adhesion of the composition to a polarizer or various transparent protective film.

Other examples of the monofunctional radical polymerizable compound include various (meth)acrylic acid derivatives each having a (meth)acryloyloxy group. Specific examples thereof include methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, s-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, n-octadecyl (meth)acrylate, and other alkyl (the number of carbon atoms: 1 to 20) esters of (meth)acrylic acid.

Examples of the above-mentioned (meth)acrylic derivatives include cycloalkyl (meth)acrylate such as cyclohexyl (meth)acrylate, and cyclopentyl (meth)acrylate; aralkyl (meth)acrylates such as benzyl (meth)acrylate; polycyclic (meth)acrylates such as 2-isobornyl (meth)acrylate, 2-norbornylmethyl (meth)acrylate, 5-norbornene-2-yl-methyl (meth)acrylate, 3-methyl-2-norbornylmethyl (meth)acrylate, dicyclopentenyl (meth)acrylate, dicyclopentenyloxyethyl (meth)acrylate, and dicyclopentanyl (meth)acrylate; and alkoxy-group-containing or phenoxy-group-containing (meth)acrylates such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, phenoxyethyl (meth)acrylate, and alkylphenoxypolyethylene glycol (meth)acrylates.

Other examples of the (meth)acrylic acid derivatives include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl methacrylate, 10-hydroxydecyl (meth)acrylate, 12-hydroxylauryl (meth)acrylate, and other hydroxyalkyl (meth)acrylates; [4-(hydroxymethyl)cyclohexyl]methyl acrylate, cyclohexanedimethanol mono(meth)acrylate, 2-hydroxy-3-phenoxypropyl (meth)acrylate, and other hydroxyl-group-containing (meth)acrylates; glycidyl (meth)acrylate, 4-hydroxybutyl (meth)acrylate glycidyl ether, and other epoxy-group-containing (meth)acrylates; 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, heptadecafluorodecyl (meth)acrylate, 3-chloro-2-hydroxypropyl (meth)acrylate, and other hydrogen-containing (meth)acrylates; dimethylaminoethyl (meth)acrylate, and other alkylaminoalkyl (meth)acrylates; 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, 3-hexyl-oxetanylmethyl (meth)acrylate, and other oxetanyl-group-containing (meth)acrylates; tetrahydrofurfuryl (meth)acrylate, butyrolactone (meth)acrylate, and other hetero ring-having (meth)acrylates; and a hydroxypivalic acid neopentyl glycol (meth)acrylate adduct, and p-phenylphenol (meth)acrylate.

Other examples of the monofunctional radical polymerizable compound include (meth)acrylic acid, carboxyethyl acrylate, carboxypentyl acrylate, itaconic acid, maleic acid, fumaric acid, crotonic acid, isocrotonic acid, and other carboxyl-group-containing monomers.

Additional examples of the monofunctional radical polymerizable compound include N-vinylpyrrolidone, N-vinyl-ε-caprolactam, methylvinylpyrrolidone, and other lactam-type vinyl monomers; and vinylpyridine, vinylpiperidone, vinylpyrimidine, vinylpiperazine, vinylpyrazine, vinylpyrrole, vinylimidazole, vinyloxazole, vinylmorpholine, and other vinyl monomers each having a nitrogen-containing hetero ring.

The monofunctional radical polymerizable compound may also be a radical polymerizable compound having an active methylene group. The radical polymerizable compound having an active methylene group is a compound having, at a terminal thereof or in the molecule thereof, an active double-bond group such as a (meth)acryl group, and further having an active methylene group. Examples of the active methylene group include acetoacetyl, alkoxymalonyl, and cyanoacetyl groups. The active methylene group is preferably an acetoacetyl group. Specific examples of the radical polymerizable compound having an active methylene group include 2-acetoacetoxyethyl (meth)acrylate, 2-acetoacetoxypropyl (meth)acrylate, 2-acetoacetoxy-1-methylethyl (meth)acrylate and other acetoactoxyalkyl (meth)acrylates; and 2-ethoxymalonyloxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radical polymerizable compound having an active methylene group is preferably any acetoacetoxyalkyl (meth)acrylate.

<<Polyfunctional Radical Polymerizable Compound>>

Examples of the bifunctional or the other polyfunctional radical polymerizable compound include N,N'-methylenebis (meth)acrylamide, which is a polyfunctional (meth)acrylamide derivative, tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A ethylene oxide adduct di(meth)acrylate, bisphenol A propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropaneformal (meth)acrylate, dioxane glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, EO-modified diglycerin tetra(meth)acrylate, and other esterified products each made from (meth)acrylic acid and a polyhydric alcohol; and 9,9-bis[4-(2-(meth)acryloyloxyethoxy)phenyl]fluorene. Specific examples thereof include products ARONIX M-220 (manufactured by Toagosei Co., Ltd.), LIGHT ACRYLATE 1,9 ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Co., Ltd.), SR-531 (manufactured by a company Sartomer), and CD-536 (manufactured by the Sartomer). As required, the bifunctional or the other polyfunctional radical polymerizable compound may be selected from, for example, various epoxy (meth)acrylates, urethane (meth)acrylates and polyester (meth)acrylate; and various (meth)acrylic monomers. Polyfunctional (meth) acrylamide derivatives are each large in polymerization velocity and excellent in producibility, and are further excellent in crosslink ability when a composition of a resin made therefrom is made into a cured product. It is therefore preferred to incorporate the (meth)acrylamide derivative into the curable resin composition.

It is preferred that the radical polymerizable compound contains the above-mentioned polyfunctional radical polymerizable compound to control the water absorption percentage of the cured product, and cause the resultant polarizing film to satisfy optical endurance in a severe humidifying environment. Out of the polyfunctional radical polymerizable compounds given above, compounds high in log Pow value, which will be detailed below, are preferred.

When the organic metal compound-containing composition according to the present invention is blended into a curable adhesive composition for polarizing films, the adhesive composition is preferably a composition high in octanol/water distribution coefficient (hereinafter referred to as "log Pow value"). The log Pow value of a substance is an index representing the lipophilicity of the substance, and denotes the logarithm value of the octanol/water distribution coefficient thereof. When the log Pow value is high, it is meant that the substance is lipophilic, that is, low in water absorption percentage. Although the log Pow value is measurable (by a flask immersion method described in JIS-Z-7260), the value is calculable out by calculation. The document DESCRIPTION makes use of each log Pow value calculated out by a product Chem Draw Ultra manufactured by a company Cambridge Soft. The log Pow value of any adhesive composition is calculable according to the following expression:

Log Pow value of adhesive composition=Σ(log Powi×Wi)

wherein log Powi: the log Pow value of each of components of the composition; and Wi: "the mole number of component i"/"the total mole number of the adhesive composition"

The log Pow value of the curable adhesive composition of the present invention is preferably 1 or more, more preferably 2 or more, most preferably 3 or more.

Examples of the radical polymerizable compound high in log Pow value include alicyclic (meth)acrylates such as tricyclodecanedimethanol di(meth)acrylate (log Pow=3.05), and isobornyl (meth)acrylate (log Pow=3.27); long-chain aliphatic (meth)acrylates such as 1,9-nonanediol di(meth) acrylate (log Pow=3.68), and 1,10-decanediol diacrylate (log Pow=4.10); multi-branched (meth)acrylates such as a hydroxypivalic acid neopentyl glycol (meth)acrylate adduct (log Pow=3.35), and 2-ethyl-2-butylpropanediol di(meth) acrylate (log Pow=3.92); and (meth)acrylates each containing an aromatic ring, such as bisphenol A di(meth)acrylate (log Pow=5.46), bisphenol A ethylene oxide four-mole adduct di(meth)acrylate (log Pow=5.15), bisphenol A propylene oxide two-mole adduct di(meth)acrylate (log Pow=6.10), bisphenol A propylene oxide four-adduct di(meth)acrylate (log Pow=6.43), 9,9-bis[4-(2-(meth)acryloyloxyethoxy)phenyl]fluorene (log Pow=7.48), and p-phenylphenol (meth)acrylate (log Pow=3.98).

About such radical polymerizable compounds, it is preferred to use a monofunctional radical polymerizable compound and a polyfunctional radical polymerizable compound together to make compatibility between the adhesion of the composition to a polarizer or various transparent protective films, and the optical endurance thereof in a severe environment. It is usually preferred to use the monofunctional radical polymerizable compound and the polyfunctional radical polymerizable compound together in a proportion of the former that is from 3 to 80% by weight of the radical polymerizable compounds and in a proportion of the latter that is from 20 to 97% by weight of the same.

<Embodiments of Radical Polymerization Curable Adhesive Composition>

In the case of blending the organic metal compound-containing composition according to the present invention into a curable adhesive composition for polarizing films, and using its curable component as an active-energy-ray curable component, the resultant composition is usable as an active-energy-ray curable adhesive composition. When an electron beam or the like is used as the active energy ray for the active-energy-ray curable adhesive composition, this adhesive composition does not need to contain any photopolymerization initiator. When any ultraviolet ray or visible ray is used as the active energy ray, the composition preferably contains a photopolymerization initiator.

<<Photopolymerization Initiator>>

When the radical polymerizable compound is used, the photopolymerization initiator therefor is appropriately selected in accordance with the active energy ray. When the compound is cured through any ultraviolet ray or visible ray, a photopolymerization initiator is used which can be cleaved through the ultraviolet ray or visible ray. Examples of the photopolymerization initiator include benzophenone-based compounds such as benzyl, benzophenone, benzoylbenzoic acid, and 3,3'-dimethyl-4-methoxybenzophenone; aromatic ketone compounds such as 4-(2-hydroxyethoxy)phenyl (2-hydroxy-2-propyl) ketone, α-hydroxy-α,α'-dimethylacetophenone, 2-methyl-2-hydroxypropiophenone, and α-hydroxycyclohexyl phenyl ketone; acetophenone-based compounds such as methoxyacetophenone, 2,2-dimethoxy-2-phenylacetophenone, 2,2-diethoxyacetophenone, and 2-methyl-1-[4-(methylthio)-phenyl]-2-morpholinopropane; benzoin ether-based compounds such as benzoin methyl ether, benzoin ethyl ether, benzoin isopropyl ether, benzoin isobutyl ether, and anisoin methyl ether; aromatic ketal-based compounds such as benzyl dimethyl ketal; aromatic sulfonyl chloride-based compounds such as 2-naphthalenesulfonyl chloride; optically active oxime-based compounds such as 1-phenone-1,1-propanedione-2-(o-ethoxycarbonyl) oxime; thioxanthone-based compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, and dodecylthioxanthone; camphor quinone; halogenated ketones; acylphosphinoxide; and acyl phosphonate. Out of the photopolymerization initiators, initiators high in log Pow value are preferred. The log Pow value of the photopolymerization initiator is preferably 2 or more, more preferably 3 or more, and most preferably 4 or more.

The blend amount of the photopolymerization initiator is 20 parts or less by weight for 100 parts by weight of the whole of the curable component (radical polymerizable compound). The blend amount of the photopolymerization initiator is preferably from 0.01 to 20 parts by weight, more preferably from 0.05 to 10 parts by weight, even more preferably from 0.1 to 5 parts by weight.

In the case of blending the organic metal compound-containing composition according to the present invention into a curable adhesive composition for polarizing film, and using, as its curable component, a visible-ray curable component containing a radical polymerizable compound, it is preferred to use a photopolymerization initiator high in sensitivity, particularly, to rays having a wavelength of 380 nm or more. This photopolymerization initiator, which is high in sensitivity to rays having a wavelength of 380 nm or more, will be detailed later.

It is preferred to use, as the photopolymerization initiator, a compound represented by the following general formula (1):

[Formula 1]

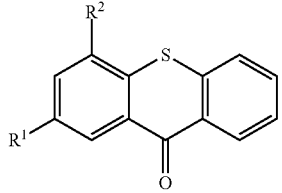

(1)

wherein $R^1$ and $R^2$ each represent —H, —$CH_2CH_3$, -iPr or Cl, and $R^1$ and $R^2$ may be the same as or different from each other; singly or use the compound together with a photopolymerization initiator high in sensitivity to rays having a wavelength of 380 nm or more, which will be detailed later. When the compound represented by the general formula (1) is used, the resultant composition is better in adhesion than when the photopolymerization initiator, which is high in sensitivity to rays having a wavelength of 380 nm or more, is used singly. Out of compounds each represented by the general formula (1), preferred is diethylthioxanthone, which is a compound in which $R^1$ and $R^2$ are each —$CH_2CH_3$ in the formula (1). About the composition proportion of the compound represented by general formula (1) in the adhesive composition, the amount of the compound is preferably from 0.1 to 5 parts by weight, more preferably from 0.5 to 4 parts by weight, even more preferably from 0.9 to 3 parts by weight for 100 parts by weight of the whole of the curable component.

It is also preferred to add a polymerization initiation aid to the composition as required. Examples of the polymerization initiation aid include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Ethyl 4-dimethylaminobenzoate is particularly preferred. When the polymerization initiation aid is used, the addition amount thereof is usually from 0 to 5 parts by weight, preferably from 0 to 4 parts by weight, most preferably from 0 to 3 parts by weight for 100 parts by weight of the whole of the curable component.

A known photopolymerization initiator is together used as required. A transparent protective film having UV absorbing power does not transmit rays having a wavelength of 380 nm or less. It is therefore preferred to use, as the photopolymerization initiator, a photopolymerization initiator high in sensitivity to rays having a wavelength of 380 nm or more. Specific examples thereof include 2-methyl-1-(4-methylthiophenyl)-2-morpholinopropane-1-one, 2-benzyl-2-dimethylamino-1-(4-morpholinophenyl)-butanone-1,2-(dimethylamino)-2[(4-methylphenyl)methyl]-1-[4-(4-morpholinyl) phenyl]-1-butanone, 2,4,6-trimethylbenzoyl-diphenyl-phosphine oxide, bis(2,4,6-trimethylbenzoyl)-phenylphosphine oxide, and bis(η5-2,4-cyclopentadiene-1-yl)-bis(2,6-difluoro-3-(1H-pyrrole-1-yl)-phenyl)titanium.

It is particularly preferred to use the photopolymerization initiator of the general formula (1) plus a compound represented by the following general formula (2):

[Formula 2]

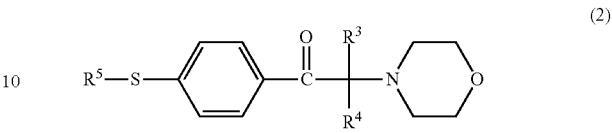

(2)

wherein $R^3$, $R^4$ and $R^5$ each represent —H, —$CH_3$, —$CH_2CH_3$, -iPr or Cl, and $R^3$, $R^4$ and $R^5$ may be the same as or different from each other. The compound represented by the general formula (2) is preferably
2-methyl-1-(4-methylthiophenyl)-2-morpholinopropane-1-one,
which is also commercially available (trade name: IRGACURE 907; maker: BASF). Besides, the following are preferred because of a high sensitivity thereof:
2-benzyl-2-dimethylamino-1-(4-morpholinophenyl)-butanone-1 (trade name: IRGACURE 369; maker: BASF), and
2-(dimethylamino)-2-[(4-methylphenyl)-1-[4-(4-morpholinyl)phenyl]-1-butanone,
(trade name: IRGACURE 379; maker: BASF).

<Radical Polymerizable Compound (a1) Having Active Methylene Group and Radical Polymerization Initiator (a2) Having Hydrogen-Withdrawing Effect>

When a radical polymerizable compound (a1) having an active methylene group is used as the radical polymerizable compound in the above-mentioned active-energy-ray curable adhesive composition, it is preferred to use a combination of the compound (a1) with a radical polymerization initiator (a2) having hydrogen-withdrawing effect. This structure makes a remarkable improvement of the resultant adhesive layer which a polarizing film has in adhesion even just after this film is taken out from a high-humidity environment or water (even when the film is in a non-dried state). The reason therefor is unclear; however, the improvement would be caused as follows: While the radical polymerizable compound (a1) having an active methylene group is polymerized together with one or more different radical polymerizable compounds contained in the adhesive layer, the compounds are taken into the main chain and/or side chains of the base polymer in the adhesive layer so that this compound-taken-into base polymer forms the adhesive layer. When the radical polymerization initiator (a2) having hydrogen-withdrawing effect is present in this polymerization step, the base polymer, which is contained in the adhesive layer, is produced while hydrogen is withdrawn from the radical polymerization initiator (a2) having an active methylene group, so that radicals are generated in the methylene group. The methylene group, in which the radicals are generated, then reacts with hydroxyl groups of PVA or other hydroxyl groups of the polarizer, so that covalent bonds are formed between the adhesive layer and the polarizer. It is presumed that the covalent-bond-formation results in the remarkable improvement of the adhesive layer which the polarizing film has in adhesion, in particular, when the present polarizing film is in a non-dry state.

In the present invention, examples of the radical polymerization initiator (a2) having hydrogen-withdrawing effect include a thioxanthone-based radical polymerizable initiator, and a benzophenone-based radical polymerization initiator. The radical polymerization initiator (a2) is preferably a thioxanthone-based radical polymerization initiator. The thioxanthone-based radical polymerization initiator may be, for example, any compound represented by the general formula (1). Specific examples of the compound represented by the general formula (1) include thioxanthone, dimethylthioxanthone, diethylthioxanthone, isopropylthioxanthone, and chlorothioxanthone. Out of compounds each represented by the general formula (1), ethylthioxanthone is particularly preferred, in which $R^1$ and $R^2$ are each $-CH_2CH_3$ in the formula (1).

In a case where the active-energy-ray curable adhesive composition contains the radical polymerizable compound (a1) having an active methylene group and the radical polymerization initiator (a2) having hydrogen-withdrawing effect, it is preferred that the composition contains the radical polymerizable compound (a1) having an active methylene group in a proportion of 1 to 50% by weight of the whole of the curable component(s), and contains the radical polymerization initiator (a2) in an amount of 0.1 to 10 parts by weight for 100 parts by weight of the total of curable components.

As described above, in the present invention, in the presence of the radical polymerization initiator (a2) having hydrogen-withdrawing effect, radicals are generated in the radical polymerizable compound (a1) having an active methylene group at the methylene group, so that the methylene group reacts with hydroxyl groups of PVA and other hydroxyl groups of the polarizer to form covalent bonds. Thus, in order to generate radicals in the radical polymerizable compound (a1) having an active methylene group at the methylene group to form such covalent bonds sufficiently, the proportion of the radical polymerizable compound (a1) having the active methylene group is set into a range preferably from 1 to 50% by weight, more preferably from 3 to 30% by weight of the whole of the curable component(s). In order to improve the adhesive composition sufficiently in water resistance to be improved in adhesion in a non-dry state, the proportion of the radical polymerizable compound (a1) having an active methylene group is preferably set to 1% or more by weight. In the meantime, if the proportion is more than 50% by weight, a curing failure may be generated in the adhesive layer. The radical polymerization initiator (a2) having hydrogen-withdrawing effect is contained in a proportion preferably from 0.1 to 10 parts by weight, more preferably from 0.3 to 9 parts by weight for 100 parts by weight of the whole of the curable component(s). In order to advance the hydrogen withdrawing reaction sufficiently, the radical polymerization initiator (a2) having hydrogen-withdrawing effect is used preferably in an amount of 0.1 part or more by weight. In the meantime, if the amount is more than 10 parts by weight, the initiator may not be completely dissolved in the composition.

<2: Cationic Polymerization Curable Adhesive Composition>

A cationically polymerizable compound used in the cationic polymerization curable resin composition is classified into a monofunctional cationically polymerizable compound having, in the molecule thereof, a single cationically polymerizable functional group, or a polyfunctional cationically polymerizable compound having, in the molecule thereof, two or more cationically polymerizable functional groups. The monofunctional cationically polymerizable compound is relatively low in liquid viscosity; thus, by incorporating this compound into the resin composition, the resin composition can be lowered in liquid viscosity. Moreover, in many cases, the monofunctional cationically polymerizable compound has a functional group for expressing various functions; thus, by incorporating the compound into the resin composition, the resin composition and/or a cured product of the resin composition can express various functions. The polyfunctional cationically polymerizable compound can crosslink a cured product of the resin composition three-dimensionally; thus, it is preferred to incorporate the polyfunctional cationically polymerizable compound into the resin composition. About the ratio between the monofunctional cationically polymerizable compound and the polyfunctional cationically polymerizable compound, it is preferred to mix 10 to 100 parts by weight of the polyfunctional cationically polymerizable compound with 100 parts by weight of the monofunctional cationically polymerizable compound. Examples of the cationically polymerizable functional group include epoxy, oxetanyl, and vinyl ether groups. Examples of a compound having an epoxy group include aliphatic epoxy compounds, alicyclic epoxy compounds, and aromatic epoxy compounds. The cationic polymerization curable resin composition of the present invention in particular preferably contains an alicyclic epoxy compound since the composition is excellent in curability and adhesion. Examples of the alicyclic epoxy compound include 3,4-epoxycyclohexylmethyl-3,4-epoxycyclohexane carboxylate; and a caprolactone modified product, a trimethylcaprolactone modified product, and a valerolactone modified product of 3,4-epoxycyclohexylmethyl-3,4-epoxycyclohexane carboxylate. Specific examples thereof include CELLOXIDE 2021, CELLOXIDE 2021A, CELLOXIDE 2021P, CELLOXIDE 2081, CELLOXIDE 2083 and CELLOXIDE 2085 (each manufactured by Daicel Corp.); and CYRACURE UVR-6105, CYRACURE UVR-6107, CYRACURE 30, and R-6110 (each manufactured by Dow Chemical Japan Ltd.). A compound containing an oxetanyl group has effects of improving the cationic polymerization curable resin composition of the present invention in curability and lowering the composition in liquid viscosity; thus, it is preferred to incorporate the compound into the composition. Examples of the compound containing an oxetanyl group include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane, and phenolnovolac oxetane. Commercially available are products ARONE OXETANE OXT-101, ARONE OXETANE OXT-121, ARONE OXETANE OXT-211, ARONE OXETANE OXT-221 and ARONE OXETANE OXT-212 (each manufactured by Toagosei Co., Ltd.), and others. A compound containing a vinyl ether group has effects of improving the cationic polymerization curable resin composition of the present invention in curability and lowering the composition in liquid viscosity; thus, it is preferred to incorporate the compound into the composition. Examples of the compound containing a vinyl ether group include 2-hydroxyethyl vinyl ether, diethylene glycol monovinyl ether, 4-hydroxybutyl vinyl ether, diethylene glycol monovinyl ether, triethylene glycol divinyl ether, cyclohexanedimethanol divinyl ether, cyclohexanedimethanol monovinyl ether, tricyclodecane vinyl ether, cyclohexyl vinyl ether, methoxyethyl vinyl ether, ethoxyethyl vinyl ether, and pentaerythritol-type tetravinyl ether.

<Cationic Photopolymerization Initiator>

The cationic polymerization curable resin composition contains, as its curable component, at least one compound selected from compounds each having an epoxy group, compounds each having an oxetanyl group, and compounds each having a vinyl ether group as have been detailed above, and these compounds are each cured by cationic polymerization. Thus, a cationic photopolymerization initiator is blended thereinto. This cationic photopolymerization initiator is irradiated with an active energy ray such as a visible ray, an ultraviolet ray, an X ray, or an electron beam to generate a cationic species or a Lewis acid, thereby starting a polymerization reaction of an epoxy group or an oxetanyl group. As the cationic photopolymerization initiator, an optical acid-generator that will be detailed later is preferably used. When the curable resin composition used in the present invention is used as a visible-ray curable composition, it is particularly preferred to use a cationic photopolymerization initiator high in sensitivity to light rays having a wavelength of 380 nm or more. The cationic photopolymerization initiator is generally a compound showing an absorption maximum in a wavelength range near 300 nm or of wavelengths shorter than 300 nm. Accordingly, by blending, into the initiator, a photosensitizer showing an absorption maximum in a wavelength range longer than about 300 nm, specifically, an absorption maximum to light rays having a wavelength longer than 380 nm, the resultant is sensitive to a light ray having a wavelength near this wavelength 380 nm, so that the generation of a cationic species or acid can be promoted from the cationic photopolymerization initiator. Examples of the photosensitizer include anthracene compounds, pyrene compounds, carbonyl compounds, organic sulfur compounds, persulfides, redox compounds, azo and diazo compounds, halogenated compounds, and optically reducible colorants. These compounds may be used in the form of a mixture of two or more thereof. In particular, anthracene compounds are excellent in photosensitizing effect to be preferred. Specific examples thereof include ANTHRACURE UVS-1331, and ANTBRACURE UVS-1221 (each manufactured by Kawasaki Kasei Chemicals Ltd.). The content of the photosensitizer is preferably from 0.1 to 5% by weight, more preferably from 0.5 to 3% by weight.

<Other Components>

The curable adhesive composition preferably contains components described below.

<Acrylic Oligomer (A)>

The active-energy-ray curable adhesive composition according to the present invention may contain, besides the curable component(s) related to the radical polymerizable compound, an acrylic oligomer (A) yielded by polymerizing a (meth)acrylic monomer. The incorporation of the component (A) into the active-energy-ray curable adhesive composition makes it possible that when the composition is irradiated with an active energy ray to be cured, the curing shrinkage thereof is decreased so that an interfacial stress is decreased between the adhesive and adherends such as a polarizer and a transparent protective film. As a result, the adhesion between the resultant adhesive layer and the adherends can be restrained from being lowered. In order to restrain the curing shrinkage of the cured product layer (adhesive layer) sufficiently, the content of the acrylic oligomer (A) is preferably 20 parts or less by weight, more preferably 15 parts or less by weight for 100 parts by weight of the whole of the curable component(s). If the content of the acrylic oligomer (A) is too large, the reaction velocity of the composition is intensely lowered when the composition is irradiated with an active energy ray, so that a curing failure may be caused. In the meantime, the acrylic oligomer (A) is incorporated into 100 parts by weight of the whole of the curable component(s) in an amount that is preferably 3 parts or more by weight, more preferably 5 parts or more by weight.

The active-energy-ray curable adhesive composition is preferably low in viscosity, considering the workability and evenness of the composition when the composition is painted. Thus, the acrylic oligomer (A), which is yielded by polymerizing a (meth)acrylic monomer, is also preferably low in viscosity. About the acrylic oligomer that is low in viscosity and can prevent the curing shrinkage of the adhesive layer, the weight-average molecular weight (Mw) thereof is preferably 15000 or less, more preferably 10000 or less, in particular preferably 5000 or less. In the meantime, in order to restrain the curing shrinkage of the cured product layer (adhesive layer) sufficiently, the weight-average molecular weight (Mw) of the acrylic oligomer (A) is preferably 500 or more, more preferably 1000 or more, in particular preferably 1500 or more. Specific examples of a (meth)acrylic monomer from which the acrylic oligomer (A) is made include alkyl (the number of carbon atoms: 1 to 20) esters of (meth)acrylic acid, such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, S-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, and N-octadecyl (meth)acrylate; cycloalkyl (meth)acrylates (such as cyclohexyl (meth)acrylate, and cyclopentyl (meth)acrylate); aralkyl (meth)acrylates (such as benzyl (meth)acrylate); polycyclic (meth)acrylates (such as 2-isobornyl (meth)acrylate, 2-norbornylmethyl (meth)acrylate, 5-norbornene-2-yl-methyl (meth)acrylate, and 3-methyl-2-norbornylmethyl (meth)acrylate; hydroxyl-group-containing (meth)acrylates (such as hydroxyethyl (meth)acrylate, 2-hydroxypropyl (meth)acrylate, and 2,3-dihydroxypropylmethyl-butyl (meth)acrylate; alkoxy-group-containing or phenoxy-group-containing (meth)acrylic acid esters (such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, and phenoxyethyl (meth)acrylate); epoxy-group-containing (meth)acrylic acid esters (such as glycidyl (meth)acrylate): halogen-containing (meth)acrylic acid esters (such as 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, and heptadecafluorodecyl (meth)acrylate; and alkylaminoalkyl (meth)acrylates (such as dimethylaminoethyl (meth) acrylate). These (meth)acrylates may be used singly or in any combination of two or more thereof. Specific examples of the acrylic oligomer (A) include products "ARUFON" manufactured by Toagosei Co., Ltd., "ACTFLOW" manufactured by Soken Chemical & Engineering Co., Ltd., and "JONCRYL" manufactured by BASF Japan Ltd. Out of acrylic oligomers (A) each yielded by polymerizing a (meth) acrylic monomer, oligomers high in log Pow value are preferred. The Log Pow value of the acrylic oligomers (A), which are each yielded by polymerizing a (meth)acrylic monomer, is preferably 2 or more, more preferably 3 or more, most preferably 4 or more.

<Optical Acid-Generator (B)>

The active-energy-ray curable adhesive composition may contain an optical acid-generator (B). When the active-energy-ray curable adhesive composition contains the optical acid-generator, the resultant adhesive layer can be dramatically made better in water resistance and endurance than when the composition contains no optical acid-generator.

The optical acid-generator (B) may be represented by the following general formula (3):

General formula (3)

$$L^+X^-$$ [Formula 3]

wherein $L^+$ represents any onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, a dithiocarbamate anion, and SCN—.

Out of the anions givens as the examples, particularly preferred examples as the counter anion $X^-$ in the general formula (3) are $PF_6^-$, $SbF_6^-$ and $AsF_6^-$. $PF_6^-$ and $SbF_6^-$ are especially preferred.

Accordingly, preferred specific examples of the onium salt contained in the optical acid-generator (B) in the present invention include products "CYRACURE UVI-6992" and "CYRACURE UVI-6974" (each manufactured by Dow Chemical Japan Ltd.), "ADEKA OPTOMER SP150", "ADEKA OPTOMER SP152", "ADEKA OPTOMER SP170" and "ADEKA OPTOMER SP172" (each manufactured by Adeka Corp.), "IRGACURE 250" (manufactured by Ciba Specialty Chemicals Plc.), "CI-5102" and "CI-2855" (each manufactured by Nippon Soda Co., Ltd.), "San-Aid SI-60L", "San-Aid SI-80L", "San-Aid SI-100L", "San-Aid SI-110L" and "San-Aid SI-180L" (each manufactured by Sanshin Chemical Industry Co., Ltd.), "CPI-100P" and "CPI-100A" (each manufactured by San-Apro Ltd.), and "WPI-069", "WPI-113", "WPI-116", "WPI-041", "WPI-044", "WPI-054", "WPI-055", "WPAG-281", "WPAG-567" and "WPAG-596" (manufactured by Wako Pure Chemical Industries, Ltd.).

The content of the optical acid-generator (B) is 10 parts or less by weight, preferably from 0.01 to 10 parts by weight, more preferably from 0.05 to 5 parts by weight, in particular preferably from 0.1 to 3 parts by weight for 100 parts by weight of the whole of the curable component(s).

<Compound (C) Containing Alkoxy Group(s) or Epoxy Group(s)>

In the active-energy-ray curable adhesive composition, the optical acid-generator (B) may be used together with a compound (C) containing one or more alkoxy groups, or one or more epoxy groups.

(Compound and Polymer Each Containing Epoxy Group(s)) (C)

In the case of using a compound having, in the molecule thereof, one or more epoxy groups, or a polymer having, in the molecule thereof, two or more epoxy groups (epoxy resin) a compound may be together used which has, in the molecule, two or more functional groups reactive with the epoxy group(s). Examples of the functional group(s) reactive with the epoxy group(s) include a carboxyl group, a phenolic hydroxyl group, a mercapto group and primary or secondary aromatic amino groups. The epoxy compound or polymer in particular preferably contains, in a single molecule thereof, two or more of these functional groups, considering the three-dimensional curability of the adhesive composition.

The polymer having, in the molecule thereof, one or more epoxy groups is, for example, an epoxy resin. Examples thereof include bisphenol A type epoxy resin, which is derived from bisphenol A and epichlorohydrin, bisphenol F type epoxy resin, which is derived from bisphenol F and epichlorohydrin, bisphenol S type epoxy resin, phenol novolac type epoxy resin, cresol novolac type epoxy resin, bisphenol A novolac type epoxy resin, bisphenol F novolac type epoxy resin, alicyclic epoxy resin, diphenyl ether type epoxy resin, hydroquinone type epoxy resin, naphthalene type epoxy resin, biphenyl type epoxy resin, fluorene type epoxy resin, trifunctional type epoxy resin, tetrafunctional type epoxy resin, other polyfunctional type epoxy resin, glycidyl ester type epoxy resin, glycidyl amine type epoxy resin, hydantoin type epoxy resin, isocyanurate type epoxy resin, and aliphatic chain-form epoxy resin. These epoxy resins may be halogenated or hydrogenated. Examples of a commercially available epoxy resin products include products JER COATs 828, 1001, 801N, 806, 807, 152, 604, 630 and 871, and YX8000, YX8034 and YX4000 manufactured by Japan Epoxy Resins Co., Ltd., EPICHLON 830, EXA 835LV, HP 4032D and HP 820 manufactured by DIC Corp., EP 4100 series, EP 4000 series and EPU series manufactured by Adeka Corp., CELLOXIDE series (2021, 2021P, 2083, 2085, 3000 and others), EPOLEAD series, and EHPE series (each manufactured by Daicel Corp.), YD series, YDF series, YDCN series, YDB series, and phenoxy resins (YP series and others; polyhydroxypolyethers each made from a bisphenol and epichlorohydrin and having, at both terminals thereof, epoxy groups, respectively) manufactured by Nippon Steel Chemical Co., Ltd., DENACOL series manufactured by Nagase ChemteX Corp., and EPOLIGHT series manufactured by Kyoeisha Chemical Co., Ltd. However, the epoxy resin product is not limited to these products. These epoxy resins may be used in any combination of two or more thereof. When the glass transition temperature Tg of the adhesive layer is calculated, the compound and polymer (C) each having one or more epoxy groups are not considered for the calculation.

(Compound and Polymer Each Having Alkoxyl Group(s)) (C)

The compound having, in the molecule thereof, one or more alkoxyl groups is not particularly limited as far as the compound has, in the molecule, at least one alkoxyl group, and may be a known compound. Such a compound is typically, for example, a melamine compound, an amino resin, or a silane coupling agent. When the glass transition temperature Tg of the adhesive layer is calculated, the compound and polymer (C) each having one or more alkoxyl groups are not considered for the calculation.

The blend amount of the compound (C) having one or more alkoxy groups or one or more epoxy groups is usually 30 parts or less by weight for 100 parts by weight of the whole of the curable component (s). If the content of the compound (C) in the composition is too large, the composition may be lowered in adhesion and deteriorated in impact resistance against a dropping test. The content of the compound (C) in the composition is more preferably 20 parts or less by weight. In the meantime, the composition contains the compound (C) in an amount that is preferably 2 parts or more by weight, more preferably 5 parts or more by weight from the viewpoint of the water resistance of the composition.

<Silane Coupling Agent (D)>

When the curable adhesive composition of the present invention for curing films is of an active-energy-ray curable adhesive type, an active-energy-ray curable compound is preferably used as a silane coupling agent (D). However, a compound having no active energy ray curability can also give the composition the same water resistance.

Specific examples of the silane coupling agent (D) as an active-energy-ray curable compound include vinyltrichlorosilane, vinyltrimethoxysilane, vinyltriethoxysilane, 2-(3,4 epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloylpropylmethyldiethoxysilane, 3-methacryloxypropyltriethoxysilane, and 3-acryloxypropyltrimethoxysilane.

Preferred are 3-methacryloxypropyltrimethoxysilane, and 3-acryloxypropyltrimethoxysilane.

A specific example of the silane coupling agent that has no active energy ray curability is preferably a silane coupling agent (D1) having an amino group. Specific examples of the silane coupling agent (D1) having an amino group include amino-group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; and ketimine type silanes such as N-(1,3-dimethylbutylidene)-3-(triethoxysilyl)-1-propaneamine).

Silane coupling agents (D1) each having an amino group may be used singly or in any combination of two or more thereof. In order for the adhesive composition to endure a good adhesion, out of these silane coupling agents, preferred are γ-aminopropyltrimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, and N-(1,3-dimethylbutylidene)-3-(triethoxysilyl)-1-propaneamine).

The blend amount of the silane coupling agent (D) is preferably from 0.01 to 20 parts by weight, preferably from 0.05 to 15 parts by weight, more preferably from 0.1 to 10 parts by weight for 100 parts by weight of the curable component (s). If the blend amount is more than 20 parts by weight, the adhesive composition is deteriorated in storage stability. If the amount is less than 0.1 part by weight, the composition does not exhibit a sufficient effect of adhesion water-resistance. When the glass transition temperature Tg of the adhesive layer is calculated, the silane coupling agent (D) is not considered for the calculation.

Other specific examples of the silane coupling agent that has no active energy ray curability include 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane, and imidazole silane.

<Compound (E) Having Vinyl Ether Group>

When the curable adhesive composition for polarizing films contains a compound (E) having a vinyl ether group, the adhesion water-resistance between the resultant adhesive layer and a polarizer is favorably improved. Reasons why this advantageous effect is obtained are unclear; however, it is presumed that one of the reasons is in that the vinyl ether group which the compound (E) has interacts with the polarizer to heighten adhering strength further between the polarizer and the adhesive layer. In order to heighten the adhesion water-resistance further between the polarizer and the adhesive layer, the compound (E) is preferably a radical polymerizable compound having a vinyl ether group. The content of the compound (E) is preferably from 0.1 to 19 parts by weight for 100 parts by weight of the whole of the curable component(s).

<Compound (F) that Undergoes a Keto-Enol Tautomerism>

A compound that undergoes a keto-enol tautomerism may be incorporated into the curable adhesive composition for polarizing films. For example, for an adhesive composition containing a crosslinking agent, or an adhesive composition usable in the state that a crosslinking agent is blended into the composition, an embodiment is preferably adoptable which contains the compound that undergoes a keto-enol tautomerism. This embodiment makes it possible to restrain an excessive rise of the adhesive composition in viscosity, or the gelatinization of the composition, and the production of a micro-gelatinized product, after an organic metal compound is blended into the composition, to realize an advantageous effect of extending the pot life of the composition.

The compound (F) that undergoes a keto-enol tautomerism may be a β-dicarbonyl compound that may be of various types. Specific examples thereof include β-diketones such as acetylacetone, 2,4-hexanedione, 3,5-heptanedione, 2-methylhexane-3,5-dione, 6-methylheptane-2,4-dione, and 2,6-dipmethylheptane-3,5-dione; acetoacetates such as methyl acetoacetate, ethyl acetoacetate, isopropyl acetoacetate, and tert-butyl acetoacetate; propionylacetates such as ethyl propionylacetate, ethyl propionylacetate, isopropyl propionylacetate, and tert-butyl propionylacetate; isobutyrylacetates such as ethyl isobutyrylacetate, ethyl isobutyrylacetate, isopropyl isobutyrylacetate, and tert-butyl isobutyrylacetate; and malonates such as methyl malonate, and ethyl malonate. Out of these compounds, preferred compounds are acetylacetone and acetoacetates. Such compounds (F) that undergo a keto-enol tautomerism may be used singly or in any combination of two or more thereof.

The use amount of the compound that undergoes a keto-enol tautomerism may be from 0.05 to 10 parts by weight, preferably from 0.2 to 3 parts by weight (for example, 0.3 to 2 parts by weight) for one part by weight of the organic metal compound. If the use amount of the compound is less than 0.05 part by weight for one part by weight of the organic metal compound, a sufficient advantageous effect based on the use thereof tends not to be easily exhibited. In the meantime, if the use amount of the compound is more than 10 parts by weight for one part by weight of the organic metal compound, the compound may interact excessively with the organic metal compound so that the adhesive composition does not express a target water resistance easily.

<Additives Other than the Above-Mentioned Components>

Various additives may be blended as other optional components into the curable adhesive composition for polarizing films as far as the additives do not damage the object and the advantageous effects of the present invention. Examples of the additives include polymers or oligomers such as epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-containing oligomer, silicone-based oligomer, and polysulfide-based oligomer; polymerization inhibitors such as phenothiazine, and 2,6-di-t-butyl-4-methylphenol; polymerization initiation aids; leveling agents; wettability improvers; surfactants; plasticizers;

ultraviolet absorbents; inorganic fillers; pigments; and dyes. Out of various additives, additives high in log Pow value are preferred. The log Pow value of the various additives is preferably 2 or more, more preferably 3 or more, most preferably 4 or more.

The amount of the additives is usually from 0 to 10 parts by weight, preferably from 0 to 5 parts by weight, most preferably from 0 to 3 parts by weight for 100 parts by weight of the whole of the curable component(s).

<Viscosity of Adhesive Composition>

The curable adhesive composition for polarizing films contains the above-mentioned curable component(s), and the viscosity of the adhesive composition is preferably 100 cp or less at 25° C. from the viewpoint of the paintability of the composition. If the viscosity of the curable adhesive composition of the present invention for polarizing films is more than 100 cp at 25° C., the adhesive composition may be used in the state of controlling the temperature thereof to be adjusted into 100 cp or less when painted. The viscosity ranges more preferably from 1 to 80 cp, most preferably from 10 to 50 cp. The viscosity is measurable, using an E type viscometer TVE 22LT manufactured by Toki Sangyo Co., Ltd.

In the curable adhesive composition for polarizing films, it is preferred from the viewpoint of safety to use, as its curable component, a material low in skin stimulus. The skin stimulative property can be judged in accordance with an index called P.I.I. The P.I.I is widely used as an index showing the degree of stimulative property to the skin, and is measured by a Draize test. Any measured value thereof is represented in the range of 0 to 8. As the value of a material is smaller, the material is judged to be lower in stimulative property; however, an accidental error of the measured value is large. It is therefore advisable to understand the value as a reference value. The P.I.I is preferably 4 or less, more preferably 3 or less, most preferably 2 or less.

The curable adhesive composition for polarizing films can be produced by a producing method having a first mixing step of mixing an active-energy-ray curable component (XK) with a polymerizable compound (B) having a polymerizable functional group and a carboxyl group to yield a mixed curable component, and a second mixing step of mixing the mixed curable component with at least one organic metal compound (A) selected from the group consisting of metal alkoxides and metal chelates. Components other than the components (X), (A), and (B) may be mixed with the component-system at any stage in the first and the second mixing steps.

The curable adhesive composition for polarizing films can also be produced by a producing method having a first mixing step of mixing at least one organic metal compound (A) selected from the group consisting of metal alkoxides and metal chelates with a polymerizable compound (B) having a polymerizable functional group and a carboxyl group to yield an organic-metal-compound-containing composition, and a second mixing step of mixing this organic-metal-compound-containing composition with an active-energy-ray curable component. This producing method makes the organic metal compound (A) dramatically high in stability in the organic-metal-compound-containing composition, so that in the same manner the resultant curable adhesive composition for polarizing films is also favorably heightened in stability. Components other than the components (X), (A), and (B) may be mixed with the component-system at any stage in the first and second mixing steps. The other components are preferably mixed therewith after the first mixing step to heighten the reaction rate and/or the coordination rate between the organic metal compound (A) and the polymerizable compound (B) to improve the organic metal compound in stability.

<Bulk Water Absorption Percentage>

About the curable adhesive composition for polarizing films, the bulk water absorption percentage is preferably 10% or less by weight, this percentage being measured when a cured product yielded by curing the curable adhesive composition is immersed in pure water at 23° C. for 24 hours. When a polarizing film is put in a severe environment having a high temperature and high humidity (for example, at 85° C. and 85% RH), water transmitted through its transparent protective film and its adhesive layer invades its polarizer so that a crosslinked structure of the polarizer is hydrolyzed. In this way, the alignment of a dichromic dye thereof is disturbed so that the polarizer is raised in transmittance, lowered in polarization degree and deteriorated in other optical endurances. By adjusting the bulk water absorption percentage of the adhesive layer to 10% or less by weight, the shift of water into the polarizer is restrained when the polarizing film is put in a severe environment having a high temperature and humidity so that the polarizer can be restrained from being raised in transmittance and lowered in polarization degree. The bulk water absorption percentage is preferably 5% or less by weight, more preferably 3% or less by weight, most preferably 1% or less by weight to make better the optical endurances of the adhesive layer of the polarizing film in a severe environment at a high temperature. When the polarizer and the transparent protective film are bonded to each other, the polarizer keeps therein a predetermined volume of water. Thus, when the curable adhesive composition contacts the water contained in the polarizer, the water may be repelled to cause appearance defects such as air bubbles. In order to restrain the appearance defects, it is preferred that the curable adhesive composition can absorb a predetermined volume of water. More specifically, the bulk water absorption percentage is preferably 0.01% or more by weight, more preferably 0.05% or more by weight. The bulk water absorption percentage is measured specifically by a water absorption percentage testing method described in JISK 7209.

<Curing Shrinkage Percentage>

The curable adhesive composition for polarizing films has the curable component(s). Thus, when this curable adhesive composition is cured, the composition usually suffers from curing shrinkages. The ratio of the curing shrinkage is an index representing the percentage of the curing shrinkage when an adhesive layer is formed from the curable adhesive composition for polarizing films. It is preferred that the curing shrinkage percentage of the adhesive layer becomes large in order to restrain the following: when the curable adhesive composition for polarizing films is cured to form the adhesive layer, an interfacial strain is generated to cause an adhesion failure. From this viewpoint, the above-mentioned curing shrinkage percentage, which is related to a cured product yielded by curing the curable adhesive composition for polarizing films, is preferably 10% or less. The curing shrinkage percentage is preferably smaller, and is preferably 8% or less, more preferably 5% or less. The curing shrinkage percentage is measured by a method described in JP-A-2013-104869, and is measured specifically by a method according to a curing shrinkage sensor manufactured by Sentec Co., Ltd.

<Polarizing Film>

In a polarizing film, a transparent protective film is bonded to at least single surface of a polarizer through an adhesive layer formed as a cured product layer of the curable adhesive composition for polarizing films. As described above, the adhesive layer, which is the cured product layer, preferably has a bulk water absorption percentage of 10% or less by weight.

<Adhesive Layer>

The thickness of an adhesive layer made of the curable adhesive composition is controlled preferably into the range of 0.1 to 3 µm. The thickness of the adhesive layer is more preferably from 0.3 to 2 µm, more preferably from 0.5 to 1.5 µm. It is preferred to set the thickness of the adhesive layer to 0.1 µm or more in order to restrain the generation of an adhesion failure by cohesive force of the adhesive layer or the generation of an external poorness (air bubbles) when the polarizer is laminated to the transparent protective film. In the meantime, if the thickness of the adhesive layer is larger than 3 µm, the polarizing film may not satisfy endurance.

About the curable adhesive composition, the Tg of an adhesive layer made of this composition is selected to be preferably 60° C. or higher, more preferably 70° C. or higher, even more preferably 75° C. or higher, even more preferably 100° C., even more preferably 120° C. or higher. In the meantime, if the Tg of the adhesive layer is too high, the polarizing film is lowered in bendability. Thus, the Tg of the adhesive layer is preferably 300° C. or lower, more preferably 240° C. or lower, even more preferably 180° C. or lower. The Tg<glass transition temperature> of a composition is measured, using a dynamic viscoelasticity measuring instrument RSA III manufactured by a company TA Instruments under the following conditions:

Sample size: 10 mm in width and 30 mm in length,
Clamp distance: 20 mm,
Measuring mode: tension, Frequency: 1 Hz, and Temperature-raising rate: 5° C./minute. Under the conditions, the dynamic viscoelasticity of the composition is measured, and the temperature of a peak top of tan δ is adopted as the Tg.

About the curable adhesive composition, the storage modulus of an adhesive layer made of this composition is preferably $1.0 \times 10^7$ Pa or more, more preferably $1.0 \times 10^8$ Pa or more at 25° C. For reference, the storage modulus of pressure-sensitive adhesive layers is from $1.0 \times 10^3$ to $1.0 \times 10^6$ Pa to be different from that of the adhesive layer. The storage modulus of the adhesive layer affects polarizer cracks caused when the polarizing film is subjected to heat cycles (of temperatures, for example, from −40 to 80° C.). If the adhesive layer is low in storage modulus, the polarizer cracks or other inconveniences are easily generated. The ranges of temperatures at which the adhesive layer has a high storage modulus is more preferably 80° C. or lower, most preferably 90° C. or lower. At the same time of measuring the Tg<glass transition temperature>, the storage modulus is measured under the same measuring conditions, using a dynamic viscoelasticity measuring instrument RSA III manufactured by a company TA Instruments. The dynamic viscoelasticity of a sample is measured and the storage modulus (E') value thereof is adopted.

In the present invention, a polarizing film can be produced by the following producing method:

a producing method including a painting step of painting the curable adhesive composition for polarizing films onto at least one surface of a polarizer and a transparent protective film; an adhering step of causing the polarizer and the transparent protective film to adhere onto each other; and a bonding step of radiating an active energy ray onto the resultant from the polarizer surface side or the transparent protective film surface side thereof to cure the active-energy-ray curable adhesive composition, thereby bonding the polarizer and the transparent protective film onto each other through the resultant adhesive layer. In this adhering step, the water percentage of the polarizer is preferably from 8 to 19%.

The polarizer, and the transparent polarizing film may be subjected to a surface modifying treatment before the painting of the curable adhesive composition. Specific examples of the treatment include corona treatment, plasma treatment, and saponification treatment.

The painting means of the curable adhesive composition is appropriately selected in accordance with the viscosity of the composition, and a target thickness of the resultant layer. Examples of the painting means include a reverse coater, a (direct, reverse or offset) gravure coater, a bar reverse coater, a roll coater, a die coater, a bar coater, and a rod coater. For the painting, other means, such as a dipping means, are appropriately usable.

Through the curable adhesive composition painted as described above, the polarizer and the transparent protective film are caused to adhere onto each other. The adhering between the polarizer and the transparent protective film may be performed, using, for example, a roll laminator.

<Curing of Adhesive Composition>

The curable adhesive composition for polarizing films is used as an active-energy-ray curable adhesive composition. The active-energy-ray curable adhesive composition is usable in an electron curing-type, ultraviolet-ray curing-type or visible-ray curing-type mode. The mode of the curable adhesive composition is preferably a visible-ray curable adhesive composition from the viewpoint of the producibility thereof.

<<Active-Energy-Ray Curable Mode>>

About the active-energy-ray curable adhesive composition, an adhesive layer is formed by causing a polarizer and a transparent protective film to adhere to each other, and then irradiating the active-energy-ray curable adhesive composition with an active energy ray (such as an electron beam, ultraviolet ray, or visible ray) to be cured. The direction along which the active energy ray (such as the electron beam, ultraviolet ray, or visible ray) is radiated may be any appropriate radiating direction. Preferably, the ray is radiated from the transparent protective film side of the workpiece. If the ray is radiated from the polarizer side thereof, the polarizer may be unfavorably deteriorated by the active energy ray (such as the electron beam, ultraviolet ray, or visible ray).

<<Electron-Beam Curable Mode>>

In the electron-beam curable mode, conditions for electron beam radiation may be arbitrarily selected appropriate conditions as far as the conditions are conditions making it possible to cure the active-energy-ray curable adhesive composition. In the electron beam radiation, for example, the accelerating voltage is preferably from 5 to 300 kV, more preferably from 10 to 250 kV. If the accelerating voltage is less than 5 kV, the electron beam may not unfavorably reach the adhesive to make the curing of the composition insufficient. If the accelerating voltage is more than 300 KV, a penetrating power of the beam through the sample is excessively strong to give a damage to the transparent protective film or the polarizer unfavorably. The radiation quantity is from 5 to 100 kGy, more preferably from 10 to 75 kGy. If the radiation quantity is less than 5 kGy, the adhesive is sufficiently cured. If the quantity is more than 100 kGy, the transparent protective film or the polarizer is damaged to be lowered in mechanical strength or turn yellow. Thus, the resultant cannot gain predetermined optical properties.

The electron radiation is usually performed in an inert gas. As required, however, the radiation may be performed under a condition that a small quantity of oxygen is introduced into the atmospheric air. By an appropriate introduction of oxygen, oxygen obstruction ventures to be caused in a surface of the transparent protective film onto which the electron beam is to be initially radiated, so that the transparent protective film can be prevented from being damaged. Thus, the electron beam can be effectively radiated onto only the adhesive.

<<Ultraviolet Curable Mode or Visible-Ray Curable Mode>>

In a process for producing the polarizing film, it is preferred to use, as active energy rays, rays including visible rays each having a wavelength of 380 to 450 nm, in particular, active energy rays about which the radiation quantity of visible rays each having a wavelength of 380 to 450 nm is largest. In the case of using, in the ultraviolet-ray curing-type or visible-ray curing-type mode, a transparent protective film to which ultraviolet absorbing power is given (ultraviolet non-transmissible transparent protective film), the film absorbs light rays having wavelengths shorter than about 380 nm. Accordingly, the light rays having wavelengths shorter than about 380 nm do not reach the active-energy-ray curable adhesive composition. Thus, the light rays do not contribute to a polymerization reaction of the composition. Furthermore, the light rays having wavelengths shorter than about 380 nm, which are absorbed by the transparent protective film, are converted to heat, so that the transparent protective film itself generates heat to cause a curling, a winkle and other defects of the polarizing film. Therefore, when the ultraviolet-ray curing type or visible-ray curing type is adopted in the present invention, it is preferred to use, as an active energy ray generating device, a device which does not emit light rays having wavelengths shorter than 380 nm. More specifically, the ratio between the integrated illuminance of rays having a wavelength range from 380 to 440 nm and that of rays having a wavelength range from 250 to 370 nm is preferably from 100:0 to 100:50, more preferably from 100:0 to 100:40. The active energy ray related to the present invention is preferably a gallium-sealed metal halide lamp, or an LED light source emitting light rays having a wavelength range from 380 to 440 nm. Alternatively, a light source including ultraviolet rays and visible rays are usable, examples thereof including a low-pressure mercury lamp, a middle-pressure mercury lamp, a high-pressure mercury lamp, a super-high-pressure mercury lamp, an incandescent lamp, a xenon lamp, a halogen lamp, a carbon arc lamp, a metal halide lamp, a fluorescent lamp, a tungsten lamp, a gallium lamp, an excimer laser, and sunlight. Light rays yielded by blocking ultraviolet rays having wavelengths shorter than 380 nm by use of a bandpass filter may also be used. In order to prevent the polarizing film from being curled while heightening adhesion performance between the polarizer and the transparent protective film, it is preferred to use an active energy ray obtained, through a bandpass filter that can block light rays having wavelengths shorter than 380 nm, by using a gallium-sealed metal halide lamp; or an active energy ray having a wavelength of 405 nm and yielded by using an LED light source.

In the ultraviolet-ray curing-type mode or the visible-ray curing-type mode, the active-energy-ray curable adhesive composition is preferably heated before irradiated with ultraviolet rays or visible rays (heating before irradiation). In this case, the composition is heated preferably to 40° C. or higher, or more preferably to 50° C. or higher.

The active-energy-ray curable adhesive composition is preferably heated after irradiated with ultraviolet rays or visible rays (heating after irradiation). In this case, the composition is heated preferably to 40° C. or higher, or more preferably to 50° C. or higher.

The active-energy-ray curable adhesive composition is favorably usable in the case of forming an adhesive layer, particularly, for bonding a polarizer and a transparent protective film in which the light ray transmittance of a light ray having a wavelength of 365 nm is less than 5%. The active-energy-ray curable adhesive composition according to the present invention contains a photopolymerization initiator of the general formula (1), whereby ultraviolet rays are radiated through the transparent protective film having UV absorbing power to the composition so that the adhesive layer can be cured and formed. Thus, also in a polarizing film in which transparent protective films having UV absorbing power are laminated, respectively, onto both of a polarizer, its adhesive layers are curable. Naturally, however, also in a polarizing film in which a transparent protective film having no UV absorbing power is laminated onto a polarizer, its adhesive layer is curable. The transparent protective film having UV absorbing power denotes a transparent protective film having a light ray transmittance of less than 10% to a light ray having a wavelength of 380 nm.

Examples of the method for giving UV absorbing power to a transparent protective film include a method of incorporating an ultraviolet absorbent into the transparent protective film, and a method of laminating a surface treatment layer containing an ultraviolet absorbent onto a surface of the transparent protective film.

Specific examples of the ultraviolet absorbent include oxybenzophenone-based compounds, benzotriazole-based compounds, salicylate-based compounds, benzophenone-based compounds, cyanoacrylate-based compounds, nickel complex salt-based compounds, and triazine-based compounds.

After the adhesion of the polarizer and the transparent protective film to each other, the resultant is irradiated with an active energy ray (such as an electron beam, ultraviolet ray or visible ray) to cure the active-energy-ray curable adhesive composition to form an adhesive layer. The direction along which the active energy ray (such as the electron beam, ultraviolet ray, or visible ray) is radiated may be any appropriate radiating direction. Preferably, the ray is radiated from the transparent protective film side of the workpiece. If the ray is radiated from the polarizer side thereof, the polarizer may be unfavorably deteriorated by the active energy ray (such as the electron beam, ultraviolet ray, or visible ray).

When the present polarizing film is produced through a continuous line, the line speed, which depends on the curing period of the adhesive composition, is preferably from 1 to 500 m/min., more preferably from 5 to 300 m/min., even more preferably from 10 to 100 m/min. If the line speed is too small, the line is poor in producing performance and an excessively large damage is given to the transparent protective film so that polarizing films which can endure an endurance test and others cannot be produced. If the line speed is too large, the adhesive composition is insufficiently cured so that the resultant may not gain a target adhesion.

In the polarizing film, the polarizer and the transparent protective film are bonded onto each other through the adhesive layer made of a cured layer of the active-energy-ray curable adhesive composition, and between the transparent protective film and the adhesive layer an easily adhesive layer may be laid. The easily adhesive layer may be made of a resin that may be of various types, which has, for example, a polyester skeleton, polyether skeleton, polycarbonate skeleton, polyurethane skeleton, silicone-based, polyamide skeleton, polyimide skeleton, or polyvinyl alcohol skeleton. These polymers may be used singly or in any combination of two or more thereof. In the formation of the easily adhesive layer, other additives may be added to the layer. Specifically, the following may be further used: a tackifier, an ultraviolet absorbent, an antioxidant, stabilizers such as a heat-resistant stabilizer, and others.

Usually, the easily adhesive layer is beforehand laid on the transparent protective film, and the easily adhesive layer side of the transparent protective film is bonded onto the polarizer through the adhesive layer. The formation of the easily adhesive layer is performed by painting a forming material for the easily adhesive layer onto the transparent protective film, and drying the resultant by a known technique. The forming material for the easily adhesive layer is usually prepared in the form of a solution diluted into an appropriate concentration, considering the thickness of the material after the material is dried, the smoothness of the painting, and others. The thickness of the easily adhesive layer after the drying is preferably from 0.01 to 5 µm, more preferably from 0.02 to 2 µm, even more preferably from 0.05 to 1 µm. Plural easily adhesive layers may be laid. Also in this case, it is preferred to adjust the total thickness of the easily adhesive layers into these ranges.

<Polarizer>

The polarizer is not particularly limited, and may be of various types. The polarizer is, for example, a polarizer yielded by causing a dichromic material, such as iodine or a dichromic dye, to be adsorbed onto a hydrophilic polymeric film, such as a polyvinyl alcohol-based film, partially-formalized polyvinyl alcohol-based film, or ethylene/vinyl acetate copolymer-based partially saponified film, and then drawing the resultant monoaxially; or a polyene aligned film, such as a dehydrated product of polyvinyl alcohol or de-hydrochloride treated product of polyvinyl chloride. Out of such polarizers, preferred is a polarizer composed of a polyvinyl alcohol-based film and a dichromic substance such as iodine. The thickness of these polarizers is not particularly limited, and is generally about 80 µm or less.

The polarizer yielded by dyeing a polyvinyl alcohol-based film with iodine and then drawing the resultant monoaxially can be produced, for example, by immersing polyvinyl alcohol into an aqueous solution of iodine to be dyed, and then drawing the dyed product 3 to 7 times the original length of the product. As required, polyvinyl alcohol may be immersed into an aqueous solution of boric acid or potassium iodide. Before the dyeing, as required the polyvinyl alcohol-based film may be further immersed into water to be cleaned washed with the water. The iWater cleaning of the polyvinyl alcohol-based film makes it possible to clean dirt on surfaces of the polyvinyl alcohol-based film, and the blocking agent, and additionally produce an advantageous effect of swelling the polyvinyl alcohol-based film to prevent an unevenness of the dyeing, and other unevennesses. After the dyeing with iodine, the drawing may be performed, or while the dyeing is performed, the drawing may be performed. Alternatively, after the drawing, the dyeing with iodine may be performed. The drawing may be performed in an aqueous solution of boric acid or potassium iodine, or in a water bath.

When a thin polarizer having a thickness of 10 µm or less is used as the polarizer, the curable adhesive composition can produce the advantageous effect thereof (that the polarizer satisfies optical endurances in a severe environment having a high temperature and high humidity). The polarizer, the thickness of which is 10 µm or less, is more largely affected by water than polarizers each having a thickness more than 10 µm, not to have sufficient optical endurances in a high-temperature and high-humidity environment, and to be easily raised in transmittance and lowered in degree of polarization. Accordingly, in the case of laminating the polarizer, the thickness of which is 10 µm or less, onto the transparent protective film through an adhesive layer made of a cured product of the curable adhesive composition according to the present invention, for polarizing films, which contains at least one selected from the group consisting of metal alkoxides and metal chelates, and further through the adhesive layer that has a bulk water absorption percentage of 10% or less by weight, the shift of water into the polarizer is restrained in a severe environment having a high temperature and high humidity. The restraint makes it possible to restrain the polarizing film remarkably from being raised in transmittance, lowered in degree of polarization, and deteriorated in other optical endurances. The thickness of the polarizer is preferably from 1 to 7 µm from the viewpoint of making the polarizer thin. Such a thin polarizer is favorably small in thickness unevenness, excellent in visibility, and small in dimension change, and further makes the resultant polarizing film thin.

Typical examples of the thin polarizer include thin polarizing membranes represented by described, respectively, in JP-A-S51-069644, JP-A-2000-338329, a pamphlet of WO 2010/100917, and specifications of PCT/JP2010/001460, and Japanese Patent Applications No. 2010-269002 and No. 2010-263692. These thin polarizing membranes can be yielded by a producing method including the step of drawing a polyvinyl alcohol-based resin (hereinafter referred to as a PVA-based resin) and a resin substrate for drawing in a laminate state, and the step of dyeing the laminate. This producing method makes it possible to draw the laminate without causing any inconvenience, such as breaking, by the drawing based on the supporting of the PVA based resin layer on the resin substrate for drawing even when this layer is thin.

The thin polarizing membranes are preferably polarizing membranes each yielded by the following process out of producing methods including the step of drawing the members concerned in the laminate state and the step of dyeing the laminate since the laminate can be drawn into a large ratio to improve the resultant in polarizing performance: a producing method including the step of performing the drawing in an aqueous solution of boric acid, as is described in a pamphlet of WO 2010/100917, or a specification of PCT/JP2010/001460, Japanese Patent Application No. 2010-269002, or Japanese Patent Application No. 2010-263692; and are in particular preferably membranes each yielded by a producing method including the step of drawing the laminate supplementally in the air before the drawing in the aqueous solution of boric acid, as is described in Japanese Patent Application No. 2010-269002, or Japanese Patent Application No. 2010-263692.

<Transparent Protective Film>

The material for forming the transparent protective film laid on one or each of both the surfaces of the polarizer is preferably a material excellent in transparency, mechanical strength, thermal stability, water blocking performance, isotropy, and others. Examples thereof include polyester-based polymers such as polyethylene terephthalate, and polyethylene naphthalate; cellulose-based polymers such as diacetylcellulose, and triacetylcellulose; acryl-based polymers such as polymethyl methacrylate; styrene-based polymers such as polystyrene, and acrylonitrile/styrene copolymer (AS resin); and polycarbonate-based polymers. Other examples of the material for forming the transparent protective film include polyethylene, polypropylene, cyclic or norbornene-structure-containing polyolefins, polyolefin-based polymers such as ethylene/propylene copolymer, vinyl chloride polymers, amide-based polymer such as nylon and aromatic polyamides, imide-based polymers, sulfone polymers, polyethersulfone-based polymers, polyetheretherketone-based polymers, polyphenylene sulfide-based polymers, vinyl alcohol-based polymers, vinylidene chloride-based polymers, vinylbutyral-based polymers, arylate-based polymers, polyoxymethylene-based polymers, and epoxy-based polymers; and blends of two or more of these polymers. The transparent protective film may contain one or more arbitrarily selected appropriate additives. Examples of the additive(s) include an ultraviolet absorbent, an antioxidant, a lubricant, a plasticizer, a release agent, a coloring preventive, a flame retardant, a nucleating agent, an antistatic agent, a pigment, and a colorant. The content of the above-mentioned thermoplastic resin in the transparent protective film is preferably from 50 to 100% by weight, more preferably from 50 to 99% by weight, even more preferably from 60 to 98% by weight, in particular preferably from 70 to 97% by weight. If the content of the thermoplastic resin in the transparent protective film is 50% or less by weight, a high transparency and other properties which the thermoplastic resin originally has may not be unfavorably expressed.

The transparent protective film may also be a polymer film described JP-A-2001-343529 (WO 01/37007), for example, a resin composition including a thermoplastic resin (A) having, at its side chain, a substituted imide group and/or an unsubstituted imide group, and a thermoplastic resin (B) having, at its side chain, a substituted phenyl group and/or an unsubstituted phenyl group, and a nitrile group. A specific example thereof is a film of a resin composition including an alternating copolymer made from isobutylene and N-methylmaleimide, and an acrylonitrile/styrene copolymer. The film may be a film made of a mixed extruded product of resin compositions. Such a film is small in retardation, and small in photoelastic coefficient so that the film can solve an unevenness of the resultant polarizing film that is generated by strain thereof, and other inconveniences. Additionally, the film is small in water-vapor permeability to be excellent in humidifying endurance.

In the polarizing film, the water-vapor permeability of the transparent protective film is preferably 150 g/m$^2$/24-hours or less. This structure makes it difficult that water in the air enters the polarizing film so that a change in water percentage of the polarizing film itself can be restrained. As a result, the polarizing film can be restrained from being curled or changed in dimension according to the storage environment of the film.

The material for forming the transparent protective film laid on one or each of both the surfaces of the polarizer is preferably a material excellent in transparency, mechanical strength, thermal stability, water blocking performance, isotropy and others, more preferably a material particularly having a water-vapor permeability of 150 g/m$^2$/24-hours or less, in particular preferably a material having a water-vapor permeability of 140 g/m$^2$/24-hours or less, even more preferably a material having a water-vapor permeability of 120 g/m$^2$/24-hours or less. The water-vapor permeability can be gained by a method described in the item EXAMPLES.

Examples of the material for forming the transparent protective film that satisfies the above-mentioned low water-vapor permeability include polyester resins such as polyethylene terephthalate, and polyethylene naphthalate; polycarbonate resins; arylate-based resins; amide-based resins such as nylon and aromatic polyimides; and polyethylene, polypropylene, ethylene/propylene copolymer, other polyolefin-based polymers, cyclic or norbornene-structure-containing cyclic olefin-based resins, and (meth)acryl-based resins; and blends of two or more of these resins. Out of these resins, preferred are polycarbonate-based resins, cyclic polyolefin-based resins and (meth)acryl-based resins, and particularly preferred are cyclic polyolefin-based resins and (meth)acryl-based resins.

The thickness of the transparent protective film may be appropriately determined, and is generally from about 1 to 100 µm from the viewpoint of the strength, the handleability and other workabilities of this film, the thin-layer property thereof, and others. The thickness is in particular preferably from 1 to 80 µm, more preferably from 3 to 60 µm.

When transparent protective films are laid, respectively, onto both the surfaces of the polarizer, the transparent protective films on the front and rear surfaces thereof may be films made of the same polymer material, or films made of different polymer materials.

A functional layer, such as a hard coat layer, anti-reflection layer, anti-sticking layer, diffusion layer or anti-glare layer, may be laid onto the surface of (each of) the transparent protective film(s) onto which no polarizer is bonded. The functional layer, such as the hard coat layer, anti-reflection layer, anti-sticking layer, diffusion layer or anti-glare layer, may be laid onto the transparent protective film itself, or may be separately a member different from the transparent protective film.

<Optical Film>

When put into practical use, the polarizing film is usable as an optical film in which the polarizing film is laminated onto a different optical layer. The optical layer is not particularly limited. One or two or more optical layers may be used which are used to form a liquid crystal display device, examples of the layer(s) including a reflection plate, a semi-transmission plate, retardation plates (such as half and quarter wavelength plates), and a viewing angle compensation plate. The polarizing film of the present invention is in particular preferably a reflecting polarizing film in which a reflection plate or semi-transmission reflection plate is further laminated on the polarizing film of the present invention, an elliptically polarizing plate or circularly polarizing plate in which a retardation plate is further laminated on the polarizing film, a wide viewing angle polarizing film in which a viewing angle compensation film is further laminated on the polarizing film, or a polarizing film in which a brightness enhancement film is further laminated on the polarizing film.

The optical film in which the optical layers are laminated on the polarizing film may be formed in a manner of laminating the optical layers successively and separately in a producing process of, for example, a liquid crystal display device. An optical film yielded by laminating the optical layers beforehand onto each other has an advantage of giving quality-stability and being excellent for fabricating work and others to improve the producing process of, for example, a liquid crystal display device. For the laminating, an appropriate adhesive means such as a pressure-sensitive adhesive layer is usable. At the time of the bonding of the polarizing film or the other optical film(s), optical axes thereof may be adjusted to have an appropriate arrangement angle in accordance with a target retardation property, and others.

A pressure-sensitive adhesive layer may be laid onto the polarizing film, or (each of) the optical film(s), on which the polarizing film is laminated in the form of at least one layer, in order to bond the polarizing film or the optical film onto a liquid crystal cell or any other member. A pressure-sensitive adhesive for forming the pressure-sensitive adhesive layer is not particularly limited. The pressure-sensitive adhesive is appropriately selected from, for example, pressure-sensitive adhesive layers each using, as its base polymer, acryl-based polymer, silicone-based polymer polyester, polyurethane, polyamide, polyether, or fluorine-containing or rubbery polymer; and then the selected adhesive is used. It is particularly preferred to use a pressure-sensitive adhesive which is excellent in optical transparency and shows adhesive properties of an appropriate wettability, cohesive property and adhesion to be excellent in weatherability, heat resistance and others.

The pressure-sensitive adhesive layer may be a sublayer-laminated layer composed of sublayers different from each other in, for example, composition or kind. The sublayer-laminated layer may be laid on one or each of both the surfaces of the polarizing film or the optical film. When pressure-sensitive adhesive layers are laid, respectively, onto both the surfaces, the pressure-sensitive adhesive layers may be layers different from each other in, for example, composition, kind or thickness. The thickness of (each of) the pressure-sensitive adhesive layer(s) may be appropriately determined in accordance with a use purpose or adhering strength thereof, and others, and is generally from 1 to 500 μm, preferably from 1 to 200 μm, in particular preferably from 1 to 100 μm.

A separator for covering is temporarily bonded to a naked surface of the pressure-sensitive adhesive layer until this layer is put into practical use, for example, to prevent the surface from being polluted. In this way, any contact with the pressure-sensitive adhesive layer can be prevented in the state that the layer is ordinarily handled. The separator may be an appropriate separator according to any conventional technique except the above-mentioned thickness conditions, and is, for example, a separator which is an appropriate thin piece such as a plastic film, rubber sheet, paper piece, cloth piece, nonwoven fabric piece, net, foamed sheet or metal foil piece, or a laminate made of two or more of these examples, and which is optionally coated with an appropriate peeling-off agent such as silicone or a long-chain alkyl-based or fluorine-containing agent, or molybdenum sulfide.

<Image Display Device>

The polarizing film or the optical film is favorably usable to form various devices, such as a liquid crystal display device. The liquid crystal display device may be formed substantially according to any conventional technique. Specifically, liquid crystal display devices are each generally formed, for example, by fabricating appropriately a liquid crystal cell, a polarizing film or optical film, and optional constituent parts such as a lighting system, and then integrating a driving circuit into the resultant. In the present invention, the device-forming method is not particularly limited except that the polarizing film or the optical film according to the present invention is used. Thus, the device-forming method is substantially according to any conventional technique. The liquid crystal cell may also be in any mode such as a TN mode, STN mode, or n mode.

An appropriate liquid crystal display device can be formed, examples thereof including a liquid crystal display device in which a polarizing film or an optical film is located on one or each of both the sides of a liquid crystal cell, and a liquid crystal display device in which a backlight or a reflection plate is used for a lighting system. In this case, the polarizing film or the optical film according to the present invention may be set on one or each of both the sides of the liquid crystal cell. When polarizing films or optical films are located, respectively, on both the sides, the films may be the same or different. Furthermore, when the liquid crystal display device is formed, one or more appropriate members may be located, in the form of one or two or more layers, at one or more appropriate positions, examples of the member(s) including a diffusion plate, an anti-glare layer, an anti-reflection film, a protective plate, a prism array, a lens array sheet, an optical diffusion plate, and a backlight.

EXAMPLES

Examples 1 to 10, and Comparative Examples 1 to 7

(Preparation of Organic Metal Compound-Containing Compositions)

In each of the examples, in accordance with a blend list shown in one of Tables 1 and 2, an organic metal compound-containing composition was prepared which contained only an organic metal compound (A) and a radical polymerizable compound (B) (in each of Comparative Examples 4 to 7, a metal coordinatable compound or primary alcohol having no carboxyl group). The organic metal compound (A) and the radical polymerizable compound (B) were sufficiently mixed with each other, and then the mixture was allowed to stand still for 30 minutes. After the still standing for the 30 minutes, the adhesive composition liquid was judged to be good (circular mark) when the liquid was transparent and excellent in liquid stability; or this liquid, to be bad (cross mark) when the liquid somewhat became clouded so that cloudiness or precipitation was generated (this stability evaluation is referred to also as "initial evaluation after blending"). Next, water was incorporated into the organic metal compound-containing composition allowed to stand still for the 30 minutes in a proportion of 25% by weight, and these components were sufficiently mixed with each other. The mixture was then allowed to stand still for 30 minutes to evaluate the stability of the organic metal compound-containing composition in accordance with the above-mentioned criterion (this stability evaluation is referred to also as "initial evaluation after water-incorporation"). The results of the examples are shown in Tables 1 and 2.

In each of the examples, in accordance with a blend list shown in one of Tables 1 and 2, an organic metal compound-containing composition was prepared which contained only an organic metal compound (A) and a radical polymerizable compound (B) (in each of Comparative Examples 4 to 7, a metal coordinatable compound having no carboxyl group). The organic metal compound (A) and the radical polymerizable compound (B) were sufficiently mixed with each other, and then the mixture was allowed to stand still for 30 minutes. Water was incorporated into the organic metal compound-containing composition in a proportion of 25% by weight, and these components were sufficiently mixed with each other. The composition was judged to be bad (cross mark) when the composition underwent cloudiness or the generation of precipitation after the 30 minutes elapsed; the composition, to be fair (triangular mark) when the composition was transparent after the 30 minutes elapsed but underwent cloudiness or the generation of precipitation after 24 hours elapsed; the composition, to be good (circular mark) when the composition was transparent after 24 hours elapsed but the composition underwent cloudiness or the generation of precipitation after 48 hours elapsed; or the composition, to be very good (double circular mark) when the composition was in a transparent liquid state also after 48 hours elapsed. In this way, the stability of the organic metal compound-containing composition was evaluated (this stability evaluation is referred to also as "24-hour-evaluation after water-incorporation"). The results of the examples are shown in Table 1.

TABLE 1

|  |  |  | Example 1 | Example 2 | Example 3 | Example 4 | Example 5 |
|---|---|---|---|---|---|---|---|
| Organic metal compound (A) | TA-10 | Isopropoxide | 53.1 | 36.2 | 22.1 | 54.1 | 69.3 |
|  | TA-21 | n-Butoxide |  |  |  |  |  |
|  | TA-30 | 2-Ethylhexoxide |  |  |  |  |  |
| Polymerizable compound (B) | Acrylic acid | Carboxylic acid |  |  |  | 45.9 |  |
|  | HOA-MS |  |  |  |  |  |  |
|  | M-5300 |  | 46.9 | 63.8 | 77.9 |  | 30.7 |
| Metal coordination compound | Acetylacetone | β-Diketone |  |  |  |  |  |
|  | AAEM | Ethyl acetoacetate |  |  |  |  |  |
| Composition Stability |  | Initial evaluation after blending | ○ | ○ | ○ | ○ | ○ |
|  |  | Initial evaluation after water-incorporation | ○ | ○ | ○ | ○ | ○ |
|  |  | 24-Hour-evaluation after water-incorporation | ⊙ | ⊙ | ⊙ | Δ | ○ |
| Ratio of substance (B) amount (mol) to substance (A) amount (mol) |  |  | 1 | 2 | 4 | 4 | 0.5 |

|  |  |  | Example 6 | Example 7 | Example 8 | Example 9 | Example 10 |
|---|---|---|---|---|---|---|---|
| Organic metal compound (A) | TA-10 | Isopropoxide |  | 48.6 |  |  |  |
|  | TA-21 | n-Butoxide | 61.1 |  | 90.4 | 10.2 | 85.0 |
|  | TA-30 | 2-Ethylhexoxide |  |  |  |  |  |
| Polymerizable compound (B) | Acrylic acid | Carboxylic acid |  |  | 9.6 |  |  |
|  | HOA-MS |  | 38.9 | 51.4 |  |  |  |
|  | M-5300 |  |  |  |  | 89.8 | 15.0 |
| Metal coordination compound | Acetylacetone | β-Diketone |  |  |  |  |  |
|  | AAEM | Ethyl acetoacetate |  |  |  |  |  |
| Composition Stability |  | Initial evaluation after blending | ○ | ○ | ○ | ○ | ○ |
|  |  | Initial evaluation after water-incorporation | ○ | ○ | ○ | ○ | Δ |
|  |  | 24-Hour-evaluation after water-incorporation | ○ | ○ | Δ | ⊙ | Δ |
| Ratio of substance (B) amount (mol) to substance (A) amount (mol) |  |  | 1 | 1 | 0.5 | 10 | 0.2 |

In the initial evaluation after water-incorporation, the compositions that became clouded after 30 minutes from the water-incorporation were each judged to be bad (x), and the compositions that kept transparent thereafter were each judged to be good (○).
* In the evaluation after water-incorporation, the compositions that became clouded after 24 hours were each judged to be fair (Δ); the compositions that were transparent after 24 hours but became clouded after 48 hours, to be good (○); and the compositions that were transparent even after 48 hours, to be very good (⊙).

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Organic metal compound (A) | TA-10 | Isopropoxide | 100 |  |  |  |  |  |  |
|  | TA-21 | n-Butoxide |  | 100 |  | 77.3 | 61.4 | 44.3 | 28.4 |
|  | TA-30 | 2-Ethylhexoxide |  |  | 100 |  |  |  |  |
| Polymerizable compound (B) | Acrylic acid | Carboxylic acid |  |  |  |  |  |  |  |
|  | HOA-MS |  |  |  |  |  |  |  |  |
|  | M-5300 |  |  |  |  |  |  |  |  |
| Metal coordination compound | Acetylacetone | β-Diketone |  |  |  | 29.4 |  |  |  |
|  | AAEM | Ethyl acetoacetate |  |  |  |  | 38.6 | 55.7 | 71.6 |
| Composition Stability |  | Initial evaluation after blending | ○ | ○ | ○ | ○ | ○ | ○ | ○ |
|  |  | Initial evaluation after water-incorporation | X | X | X | X | X | X | X |

TABLE 2-continued

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| 24-Hour-evaluation after water-incorporation | — | — | — | — | — | — | — |
| Ratio of substance (B) amount (mol) to substance (A) amount (mol) |  |  |  | 1 | 1 | 2 | 4 |

In the initial evaluation after water-incorporation, the compositions that became clouded after 30 minutes from the water-incorporation were each judged to be bad (x), and the compositions that kept transparent thereafter were each judged to be good (○).
* In the evaluation after water-incorporation, the compositions that became clouded after 24 hours were each judged to be fair (Δ); the compositions that were transparent after 24 hours but became clouded after 48 hours, to be good (○); and the compositions that were transparent even after 48 hours, to be very good (⊙)

In Tables 1 and 2, organic metal compounds (A) are following:

TA-10: titanium isopropoxide (the carbon number of its organic group: 3), manufactured by Matsumoto Fine Chemical Co., Ltd., TA-21: titanium butoxide (the carbon number of its organic group: 4), manufactured by Matsumoto Fine Chemical Co., Ltd., and TA-30: titanium octoxide (the carbon number of its organic group: 6), manufactured by Matsumoto Fine Chemical Co., Ltd., the radical polymerizable compounds (B) are following:

acrylic acid (manufactured by Nippon Shokubai Co., Ltd.; molecular weight: 72.06 g/mol)

M-5300: ω-carboxy-polycaprolactone (n≈2) monoacrylate, manufactured by Toagosei Co., Ltd.; molecular weight: 300.16 g/mol, and HOA-MS: 2-acryloyloxyethylsuccinic acid, manufactured by Kyoeisha Chemical Co., Ltd.; molecular weight: 216.19 g/mol, and metal coordinatable compounds having no carboxyl groups are following:

AAEM: 2-acetoacetoxyethyl methacrylate, manufactured by Nippon Synthetic Chemical Industry Co., Ltd; molecular weight: 214.22 g/mol, and β-diketone: acetylacetone, manufactured by Daicel Corp.; molecular weight: 100.117 g/mol.

The invention claimed is:

1. An organic metal compound-containing composition, comprising:
at least one organic metal compound (A) which is one or more metal alkoxides, and a polymerizable compound (B) having a polymerizable functional group and a carboxyl group
wherein the polymerizable compound (B) has a molecular weight of 250 (g/mol) or more,
and wherein the number of carbon atoms of an organic group or each of organic groups which the metal alkoxide(s) has/have is 4 or more, and
when the total amount of the organic metal compound (A) in the composition is represented by a α (mol), the content of the polymerizable compound (B) in the composition is 1α (mol) or more.

2. The organic metal compound-containing composition according to claim 1, wherein the metal of the organic metal compound (A) is titanium.

3. The organic metal compound-containing composition according to claim 1, wherein the proportion of the organic metal compound (A) is from 5 to 90% by weight.

4. The organic metal compound-containing composition according to claim 1, wherein the polymerizable compound (B) is a radical polymerizable compound.

5. The organic metal compound-containing composition according to claim 1, wherein the polymerizable compound (B) is a polymerizable compound having a polymerizable functional group and a carboxyl group between which an organic group that has 1 to 20 carbon atoms and that may have oxygen is interposed.

* * * * *